(12) United States Patent
Shinohara et al.

(10) Patent No.: US 8,284,498 B2
(45) Date of Patent: Oct. 9, 2012

(54) ZOOM LENS AND IMAGE PICKUP APPARATUS HAVING THE SAME

(75) Inventors: Kenji Shinohara, Utsunomiya (JP); Nobuyuki Miyazawa, Utsunomiya (JP); Akihisa Horiuchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 80 days.

(21) Appl. No.: 13/006,858

(22) Filed: Jan. 14, 2011

(65) Prior Publication Data
US 2011/0176225 A1 Jul. 21, 2011

(30) Foreign Application Priority Data
Jan. 16, 2010 (JP) ................................. 2010-007578

(51) Int. Cl.
*G02B 15/14* (2006.01)
(52) U.S. Cl. ...................................... 359/687
(58) Field of Classification Search .................. 359/687, 359/774
See application file for complete search history.

(56) References Cited

U.S. PATENT DOCUMENTS
7,672,063 B2    3/2010  Take
2003/0156333 A1   8/2003  Yamada
2007/0223106 A1*  9/2007  Kamo et al. ............. 359/687

FOREIGN PATENT DOCUMENTS
CN    101424781 A    5/2009
JP    3-215810 A     9/1991
JP    2000-171713 A  6/2000

OTHER PUBLICATIONS
Chinese Office Action issued in Counterpart Application No. 201110004432.6 Mar. 12, 2012. English Translation provided.

* cited by examiner

*Primary Examiner* — Joseph P Martinez
(74) *Attorney, Agent, or Firm* — Rossi, Kimms & McDowell LLP

(57) ABSTRACT

A zoom lens comprising, in order from an object side to an image side, a first lens unit of a positive refractive power, a second lens unit of a negative refractive power, a third lens unit of a positive refractive power, and a fourth lens unit of a positive refractive power. In zooming, the first lens unit is configured fixed and the second, third, and fourth lens units are configured movable. The following conditions are satisfied where f3st is a movement amount of the third lens unit associated with zooming from a wide angle end to a telephoto end, f3 is a focal length of the third lens unit, $\beta 2w$ is a lateral magnification of the second lens unit at the wide angle end, and z is a zoom ratio, $0.010<(|f3st|/f3)/z<0.045$, and $-0.33<\beta 2w<-0.20$.

8 Claims, 13 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same. The present invention is suitable for a video camera, a film-based camera, a digital camera, a TV camera, and a surveillance camera.

2. Description of the Related Art

An image pickup optical system that utilizes an image pickup device and is used for an image pickup apparatus, such as a video camera and a digital still camera, has recently demanded for a zoom lens having a high angle of view and a zoom ratio.

In general, it is necessary for a high zoom ratio of the zoom lens to improve the refractive powers of lens units for variable magnification and to increase a movement amount for zooming. However, such a zoom lens causes large aberrational fluctuations in the zooming and it becomes difficult to obtain a high optical performance over the entire zoom range.

In order to obtain a high angle of view, a high zoom ratio, and a high optical performance over the entire zoom range, it is important to properly set a zoom type, refractive power of each lens unit, and a lens configuration in each lens unit.

There is known a four-unit zoom lens that includes, in order from an object side to an image side, a first lens unit of a positive refractive power, a second lens unit of a negative refractive power, a third lens unit of a positive refractive power, and a fourth lens unit of a positive refractive power. There is also known a rear focus type four-unit zoom lens configured to move the second lens unit for variable magnification, to move the fourth lens unit for correcting image plane changes associated with the variable magnification, and to provide focusing through the fourth lens unit. See Japanese Laid-Open Patent Nos. 3-215810 and 2000-171713.

It is important for these four-unit zoom lenses to properly set a movement amount of the third lens unit associated with zooming relative to the imaging magnification and the zoom ratio of the second lens unit configured to primarily vary the magnification.

It is also important to properly set a movement amount of the second lens unit associated with zooming and a focal length (a reciprocal of the power) of each of the first, second, and third lens units.

It is difficult to obtain a high optical performance over the entire zoom range and to maintain a wide angle of view and a high zoom ratio unless these configurations are properly set.

SUMMARY OF THE INVENTION

The present invention provides a zoom lens having a wide angle of view, a high zooming range, and a high optical performance over an entire zooming range, and an image pickup apparatus having the same.

A zoom lens according to the present invention includes, in order from an object side to an image side, a first lens unit of a positive refractive power, a second lens unit of a negative refractive power, a third lens unit of a positive refractive power, and a fourth lens unit of a positive refractive power. In zooming, the first lens unit is configured fixed and the second, third, and fourth lens units are configured movable. The following conditions are satisfied where f3st is a movement amount of the third lens unit associated with zooming from a wide angle end to a telephoto end, f3 is a focal length of the third lens unit, and $\beta 2w$ is a lateral magnification of the second lens unit at the wide angle end, and z is a zoom ratio, $0.010<(|f3st|/f3)/z<0.045$, and $-0.33<\beta 2w<-0.20$.

Further features of the present invention will become apparent from the following description of exemplary embodiments with reference to the attached drawings.

DESCRIPTION OF THE EMBODIMENTS

Figure 1:
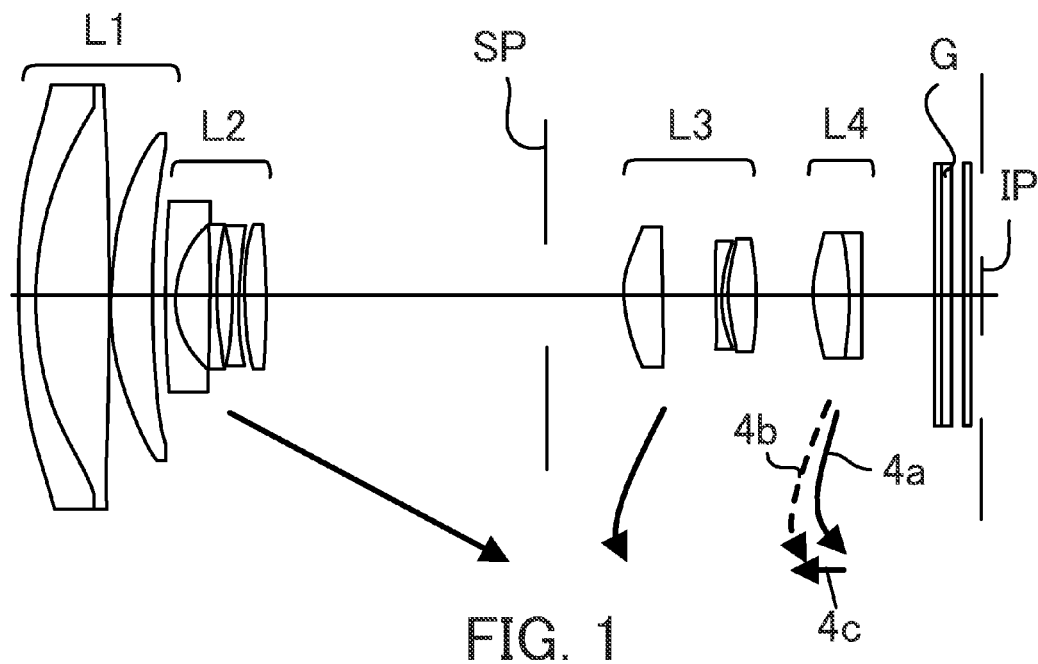
FIG. 1 is a lens sectional view at a wide angle end of a zoom lens according to a first embodiment.

Referring now to the drawings, a description will now be given of embodiments of a zoom lens and an image pickup apparatus having the same. The zoom lens of this invention includes, in order from an object side to an image side, a first lens unit of a positive refractive power, a second lens unit of a negative refractive power, a third lens unit of a positive refractive power, and a fourth lens unit of a positive refractive power. In zooming, the second, third, and fourth lens units are configured movable on the optical axis.

In the zoom lens of this invention, a lens unit having a refractive power can be arranged on at least one of the object side of the first lens unit or the image side of the fourth lens unit.

Figure 2A:
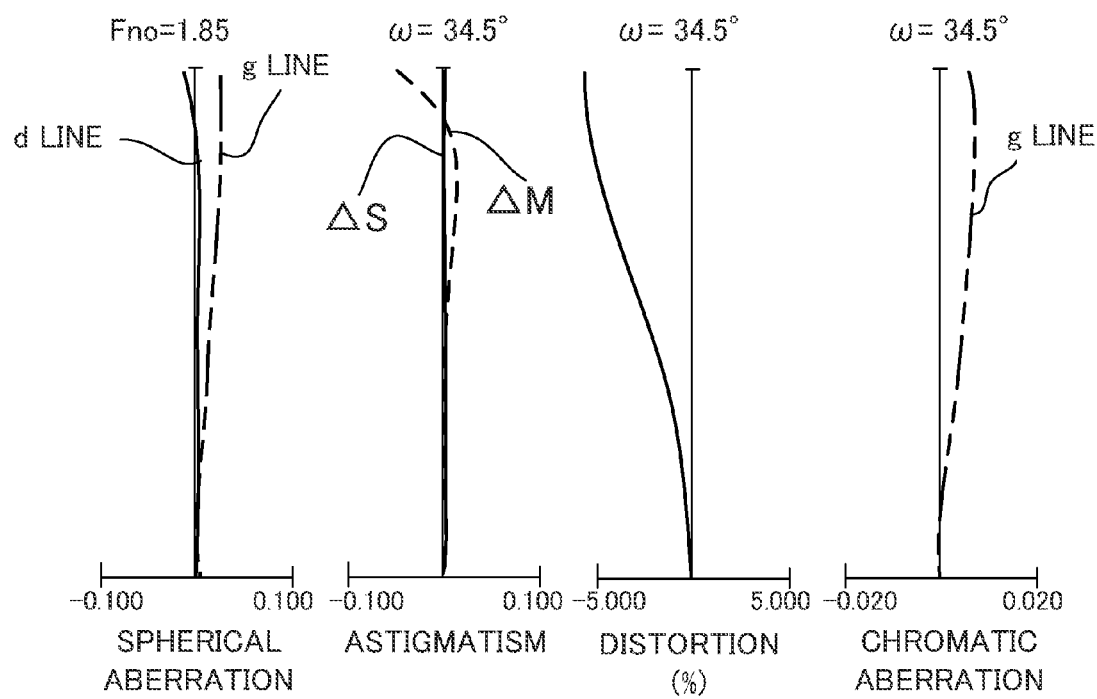
FIGS. 2A, 2B, and 2C illustrate a variety of aberrations of the zoom lens according to the first embodiment.
Figure 2B:
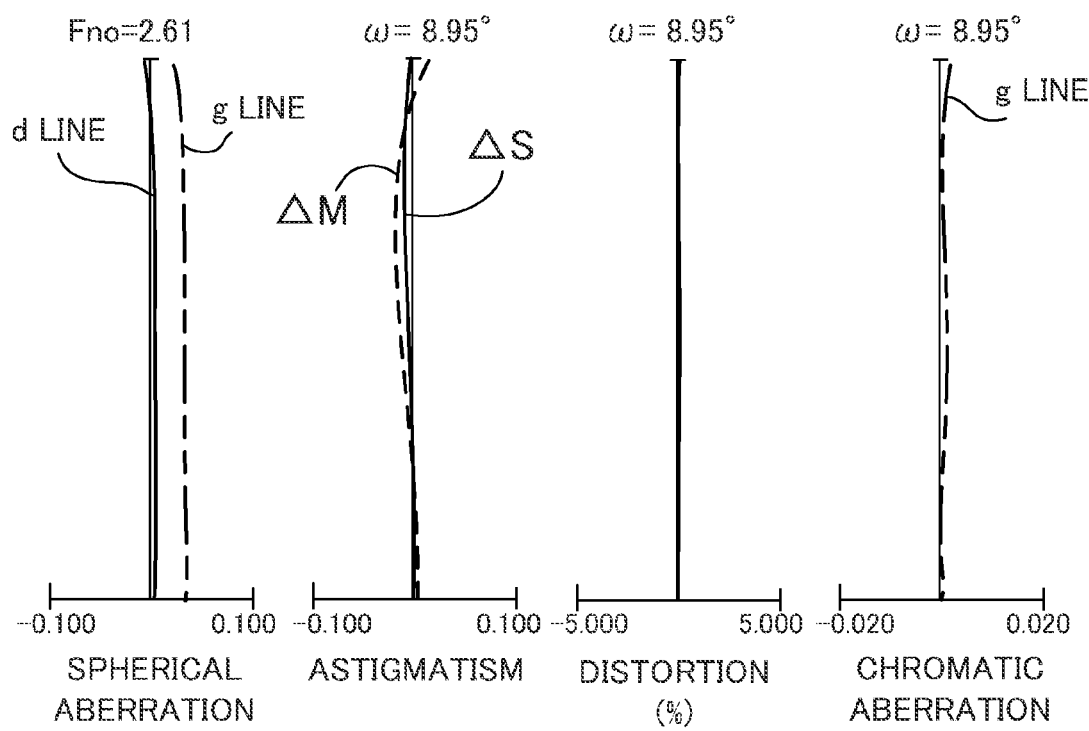
Figure 2C:
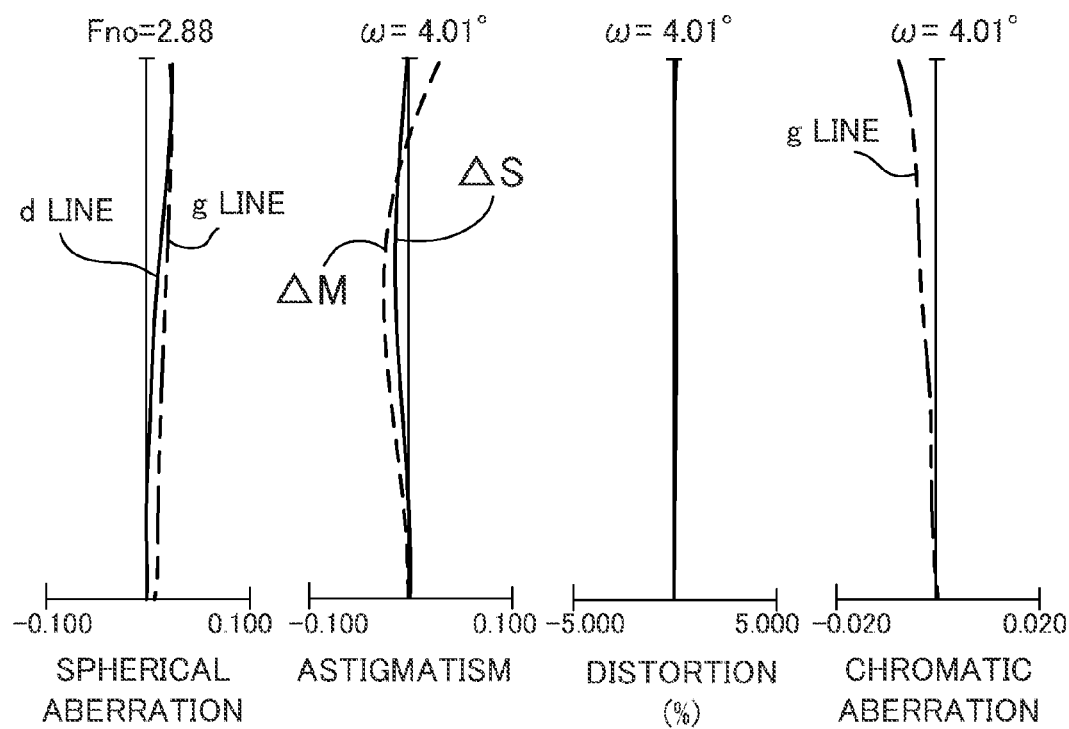
Figure 3:
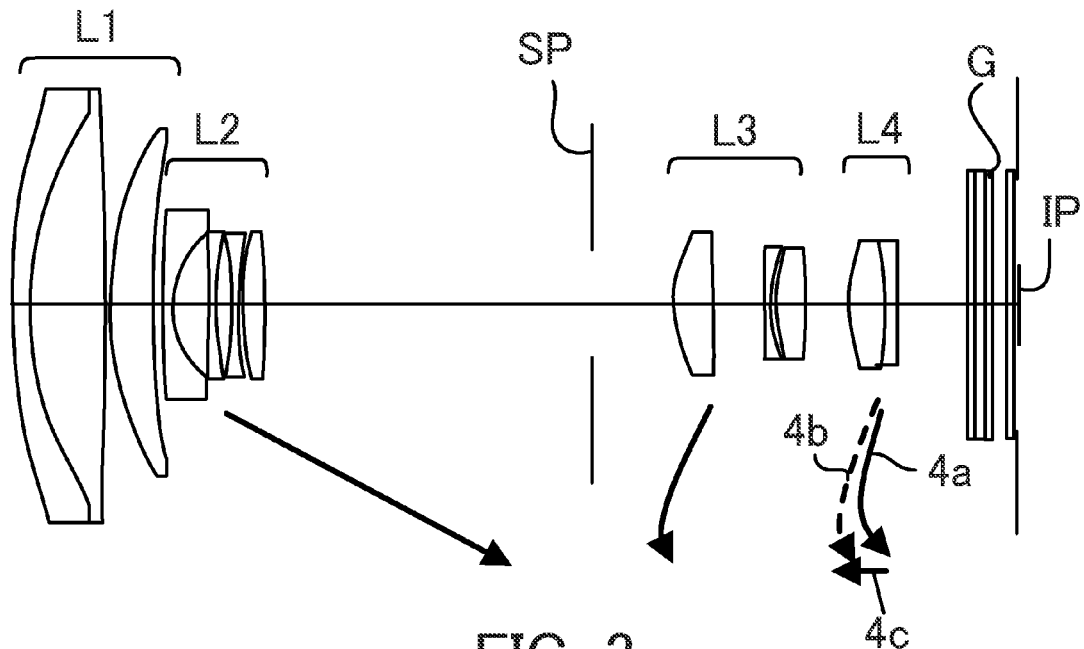
FIG. 3 is a lens sectional view at a wide angle end of a zoom lens according to a second embodiment.
Figure 4A:
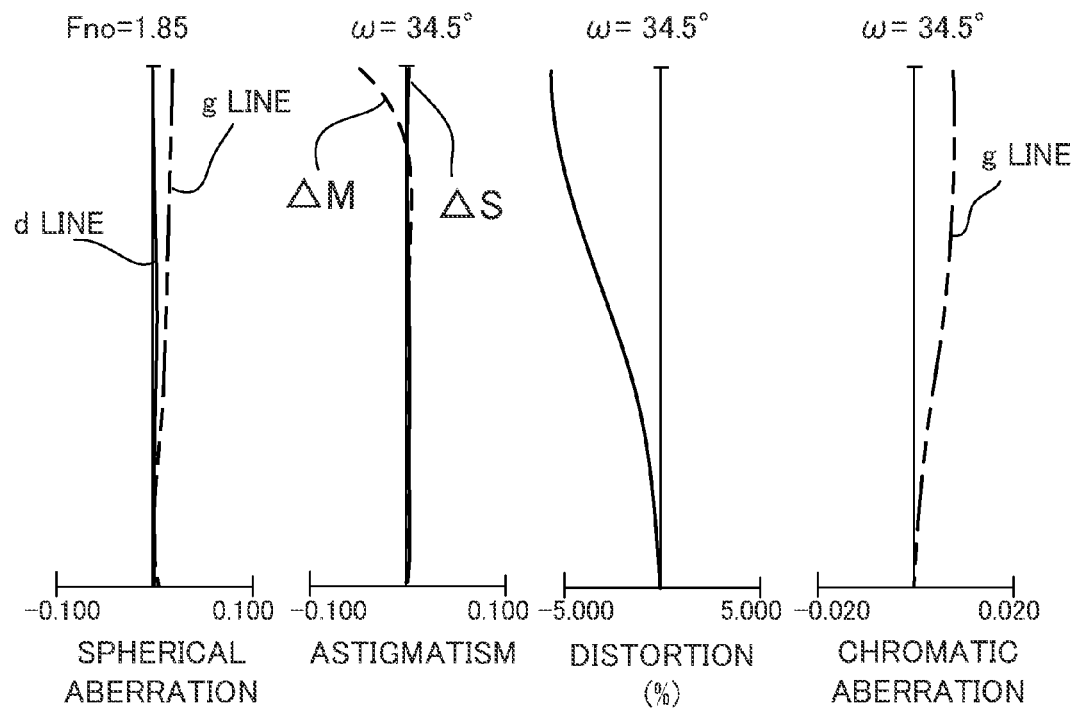
FIGS. 4A, 4B, and 4C illustrate a variety of aberrations of the zoom lens according to the second embodiment.
Figure 4B:
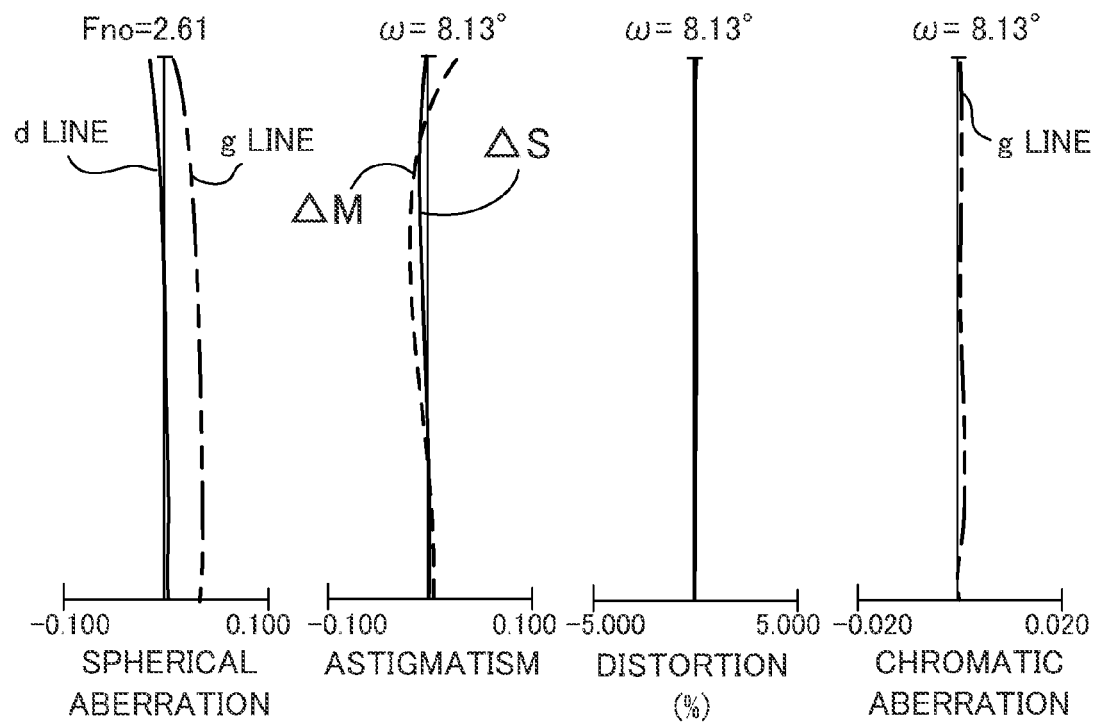
Figure 4C:
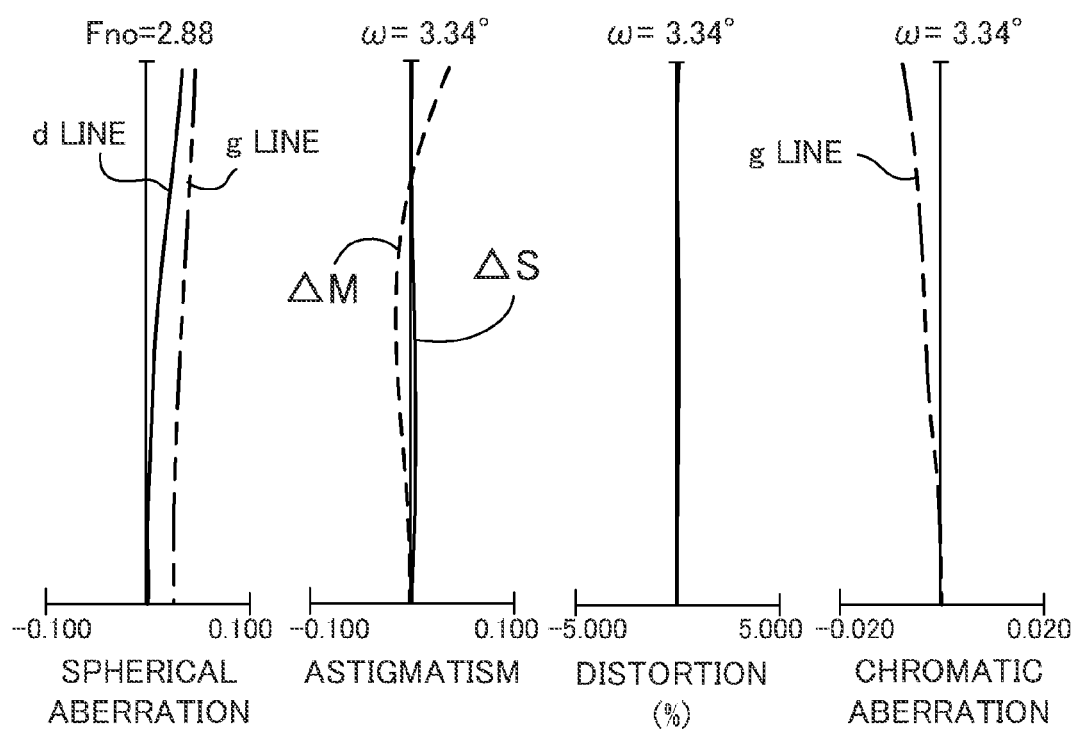
Figure 5:
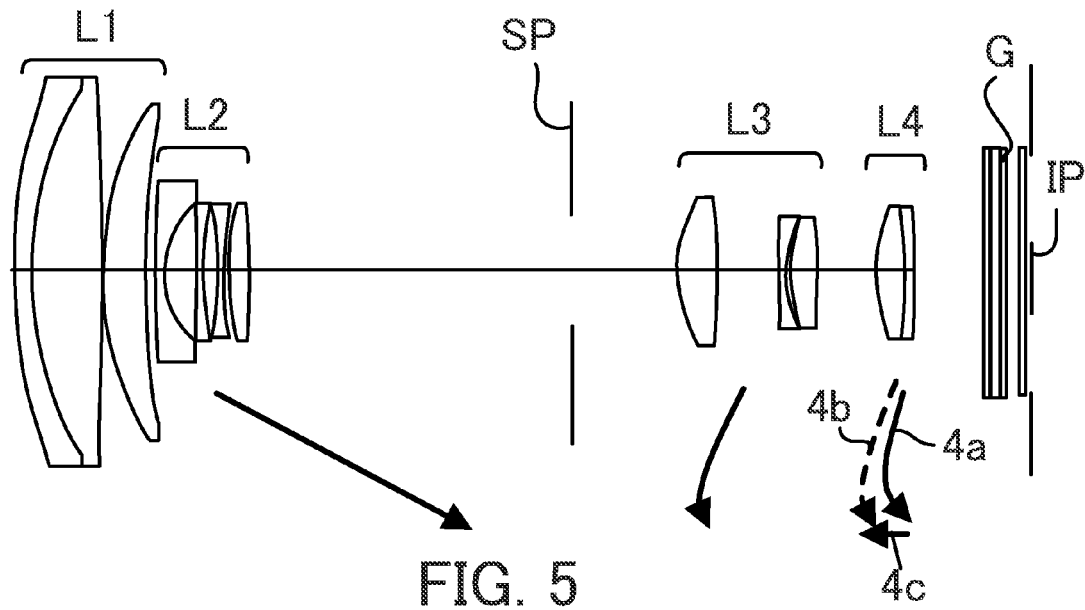
FIG. 5 is a lens sectional view at a wide angle end of a zoom lens according to a third embodiment.
Figure 6A:
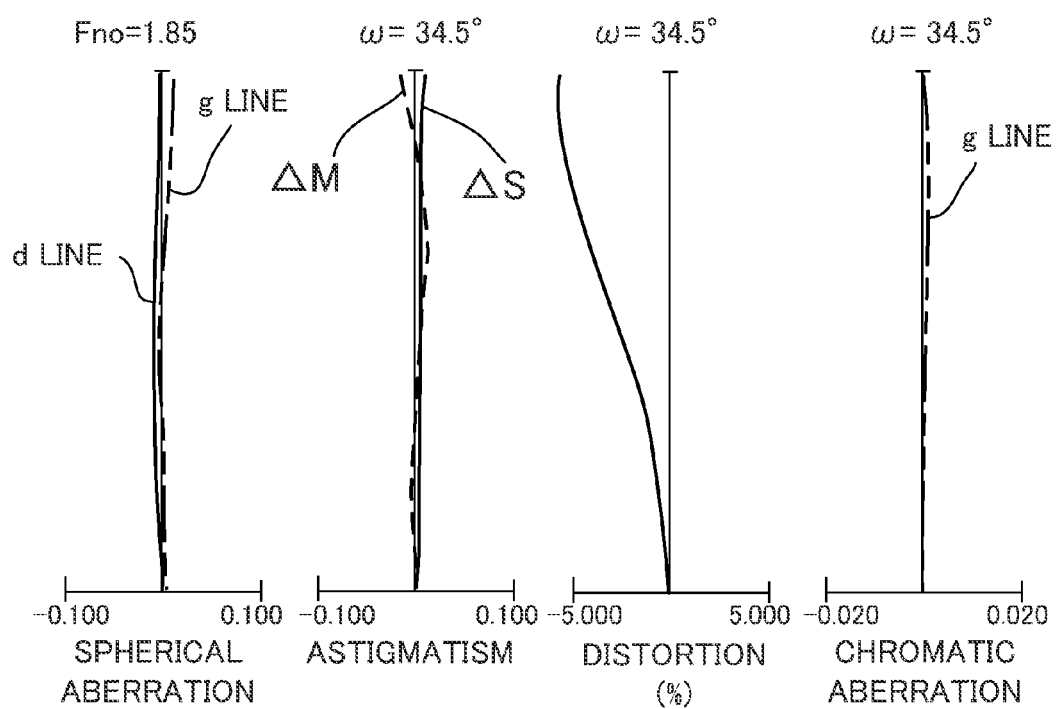
FIGS. 6A, 6B, and 6C illustrate a variety of aberrations of the zoom lens according to the third embodiment.
Figure 6B:
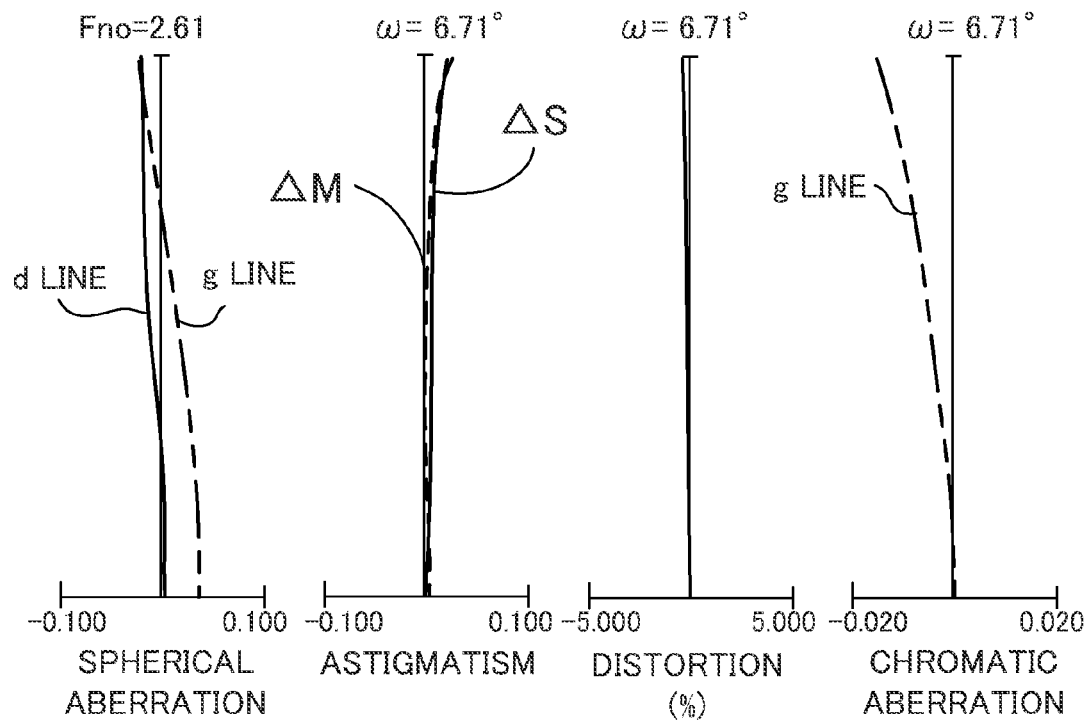
Figure 6C:
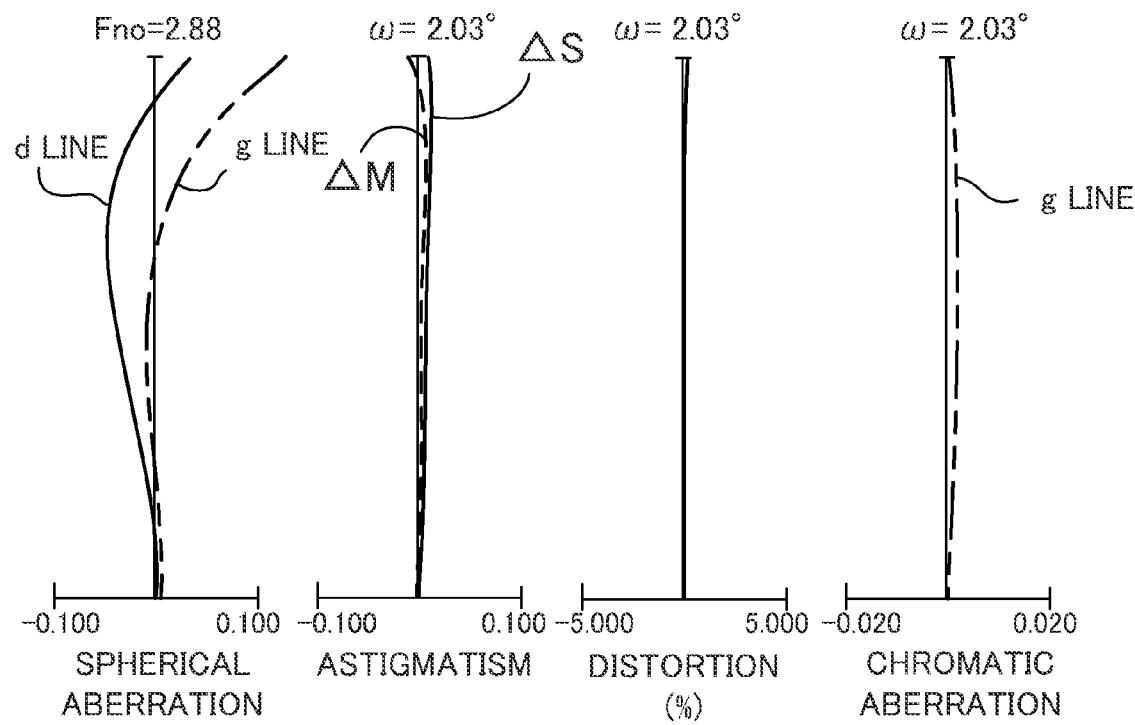

FIG. 1 is a lens sectional view of the zoom lens according to a first embodiment. FIGS. 2A, 2B, and 2C are aberrational views on a wide angle end (short focal length end), an intermediate zoom position, and a telephoto end (long focal length end) of the zoom lens according to the first embodiment. A zoom lens of a numerical example 1 has a zoom ratio of 9.81 and an image pickup angle of view of 69° on the wide angle end. FIG. 3 is a lens sectional view of a zoom lens according to a second embodiment. FIGS. 4A, 4B, and 4C are aberrational views on the wide angle end, the intermediate zoom position, and the telephoto end of the zoom lens according to the second embodiment. A zoom lens of a numerical example 2 has a zoom ratio of 11.78 and an image pickup angle of view of 69° on the wide angle end. FIG. 5 is a lens sectional view of a zoom lens according to a third embodiment. FIGS. 6A, 6B, and 6C are aberrational views on the wide angle end, the intermediate zoom position, and the telephoto end of the zoom lens according to the third embodiment. A zoom lens of a numerical example 3 has a zoom ratio of 19.40 and an image pickup angle of view of 69° on the wide angle end.

Figure 7:
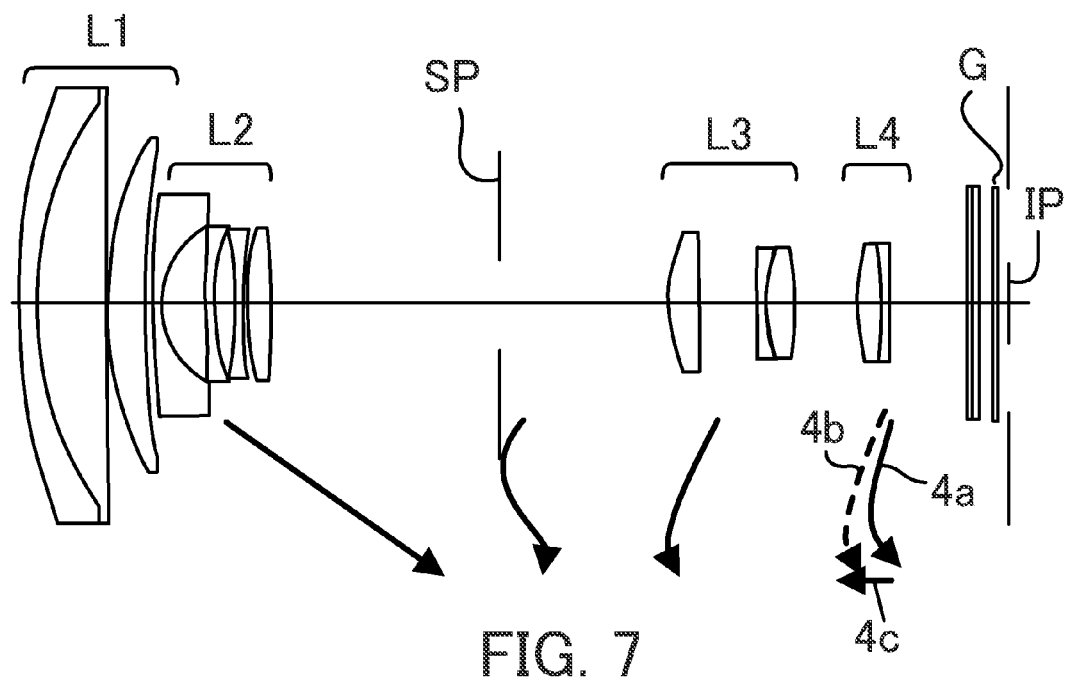
FIG. 7 is a lens sectional view at a wide angle end of a zoom lens according to a fourth embodiment.
Figure 8A:
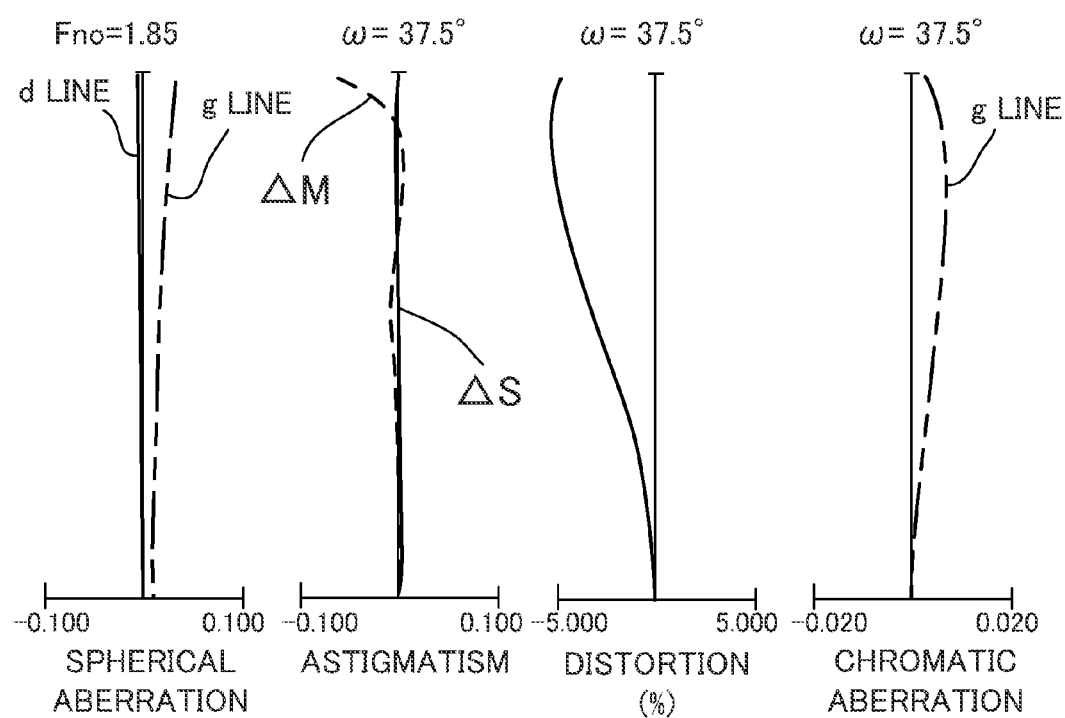
FIGS. 8A, 8B, and 8C illustrate a variety of aberrations of the zoom lens according to the fourth embodiment.
Figure 8B:
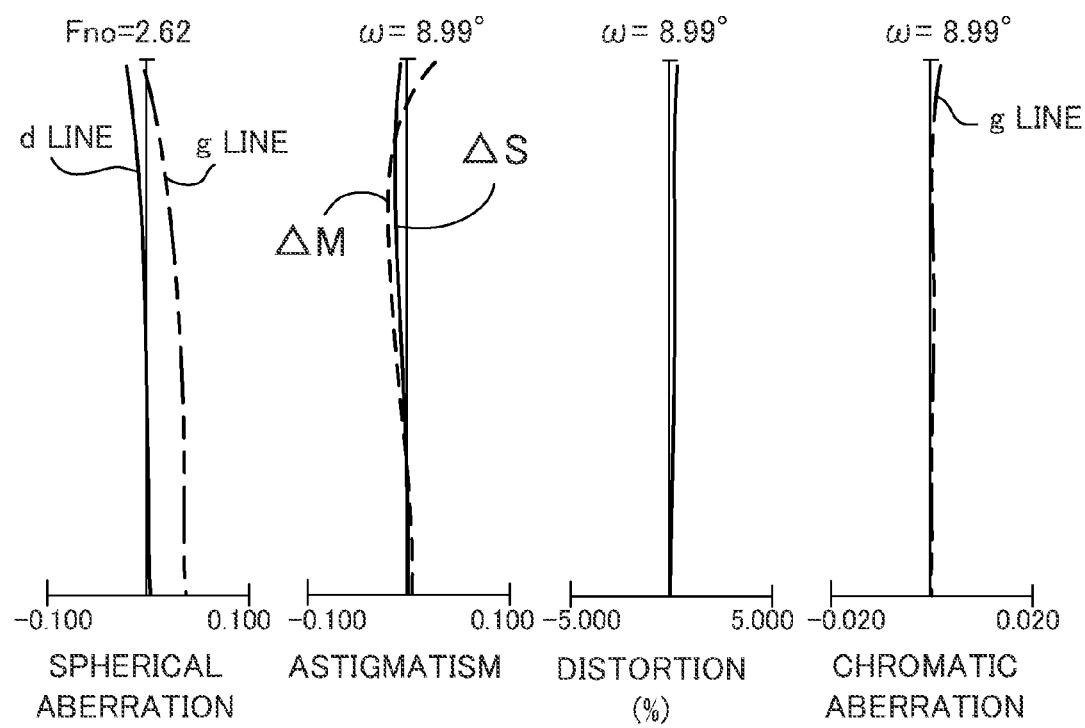
Figure 8C:
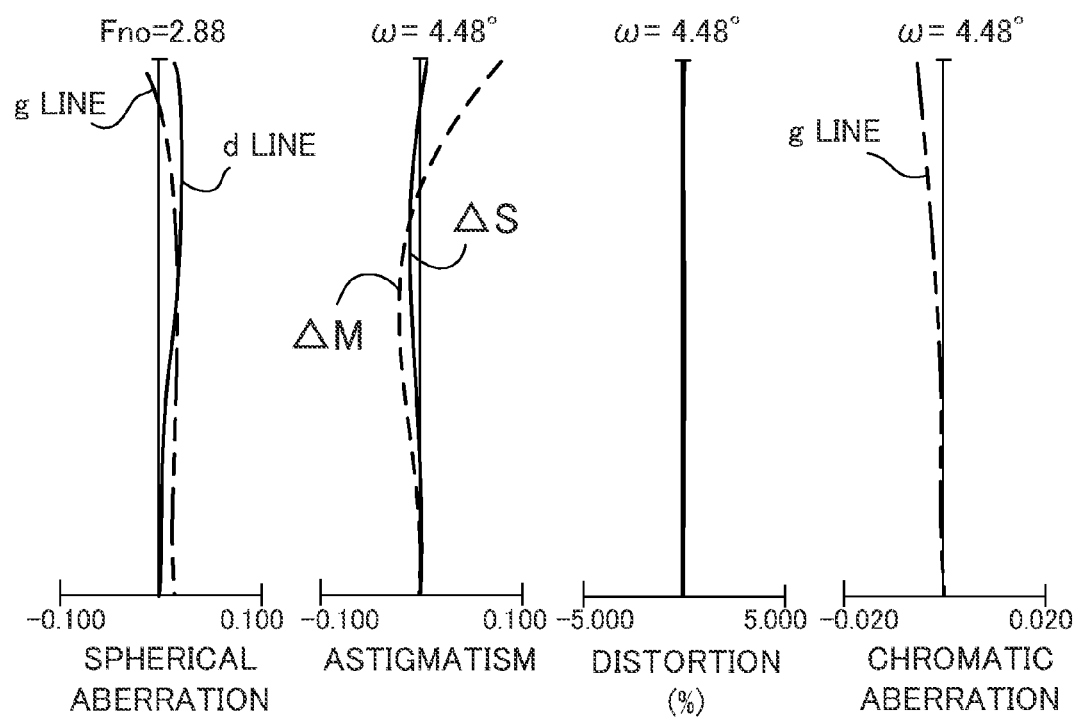
Figure 9:
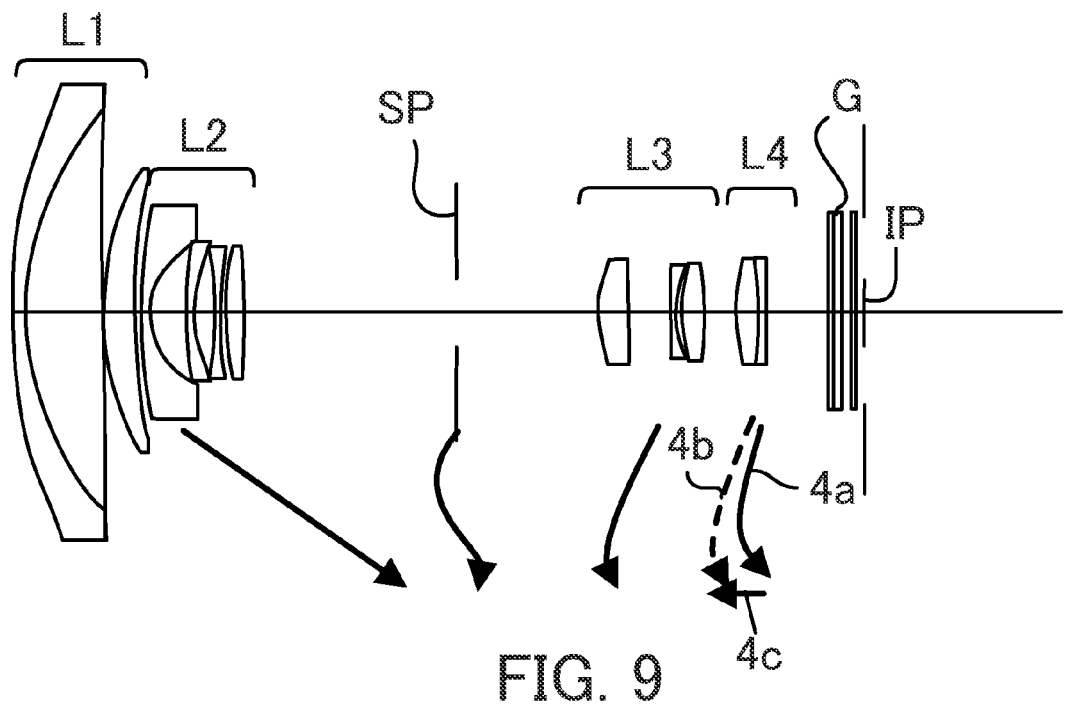
FIG. 9 is a lens sectional view at a wide angle end of a zoom lens according to a fifth embodiment.
Figure 10A:
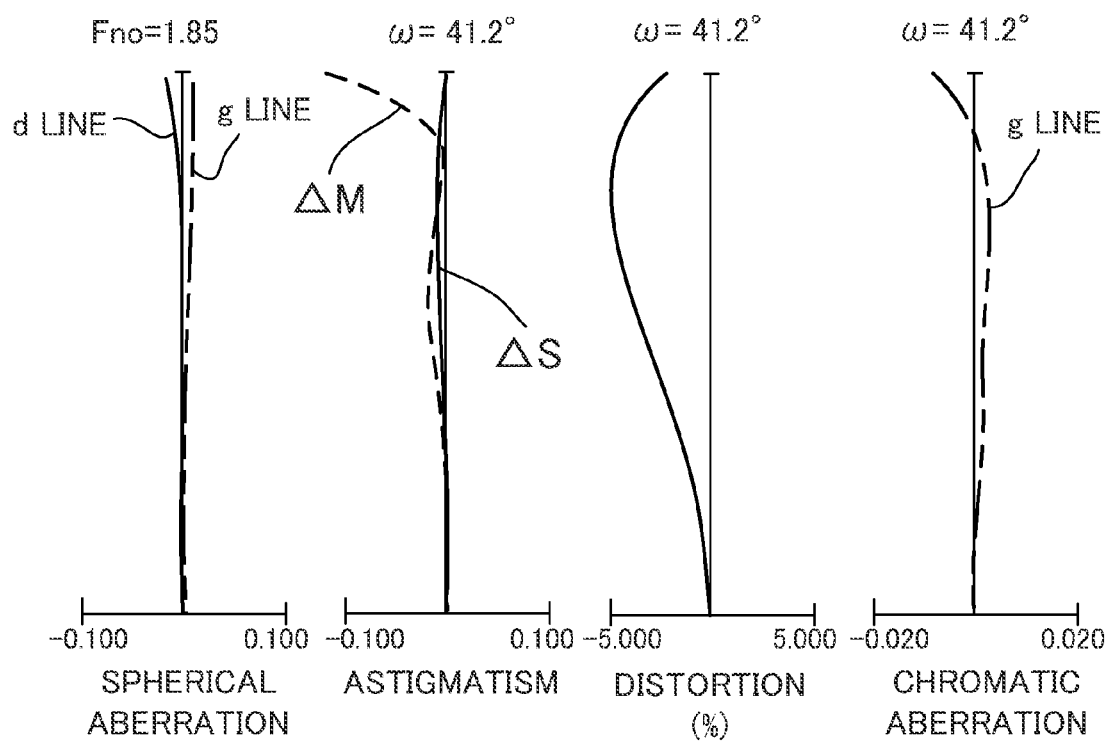
FIGS. 10A, 10B, and 10C illustrate a variety of aberrations of the zoom lens according to the fifth embodiment.
Figure 10B:
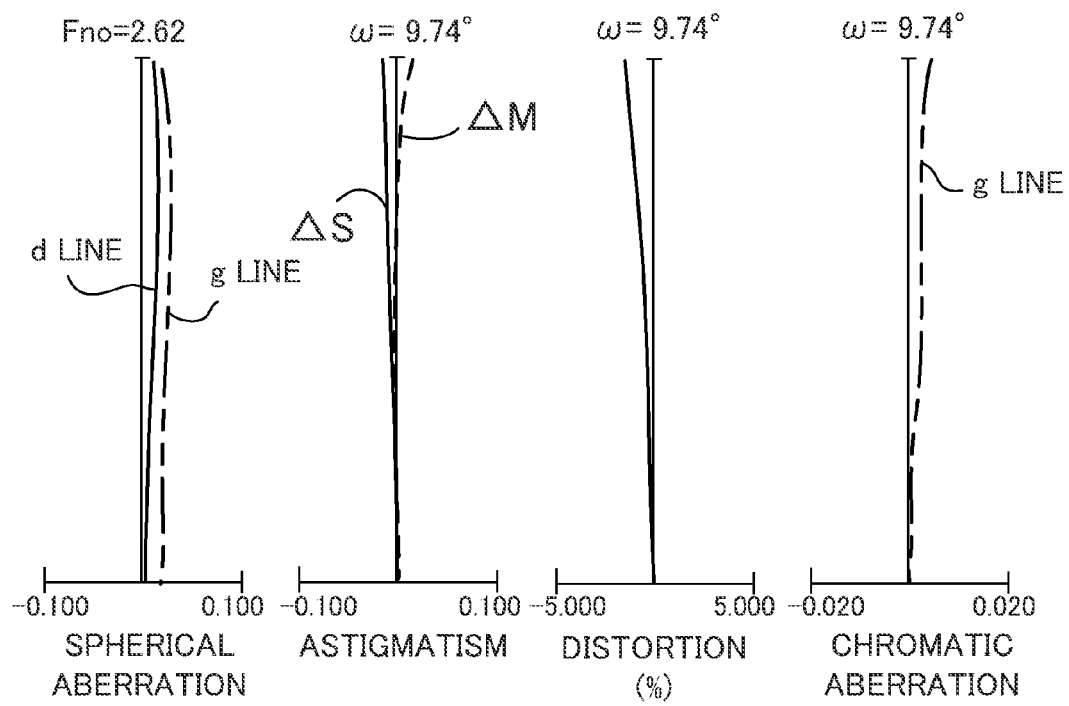
Figure 10C:
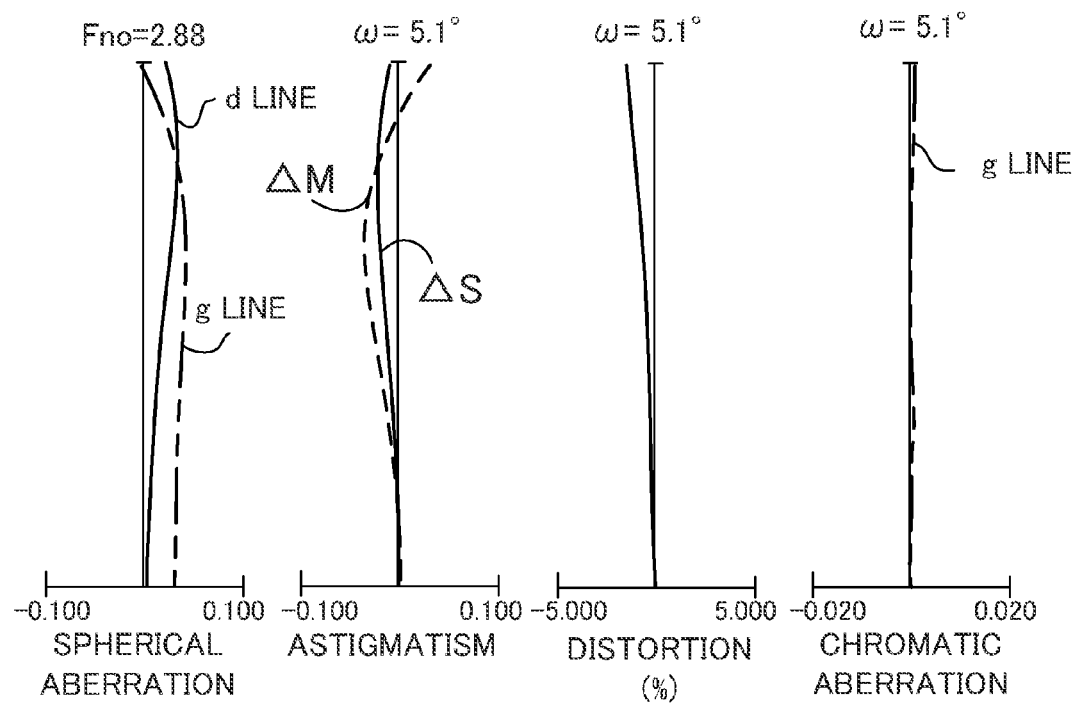
Figure 11:
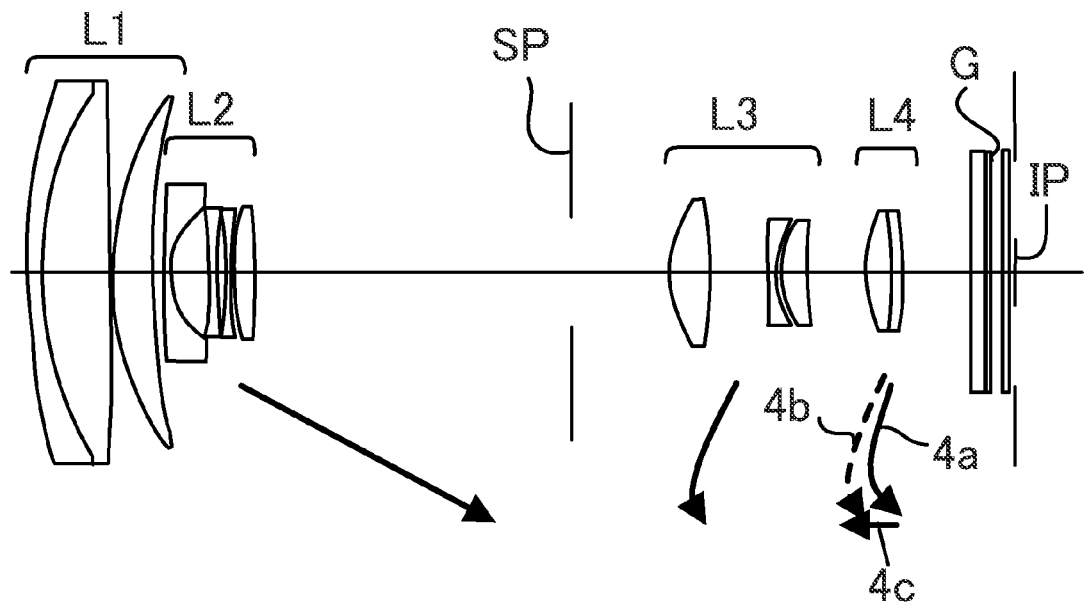
FIG. 11 is a lens sectional view at a wide angle end of a zoom lens according to a sixth embodiment.
Figure 12A:
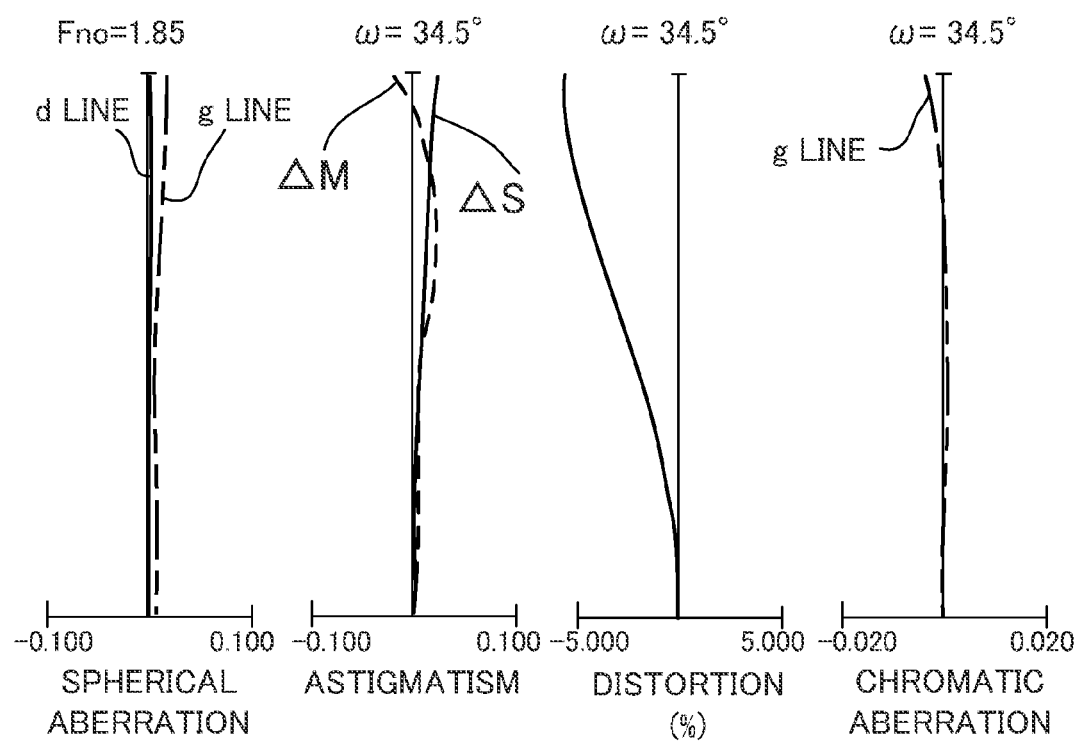
FIGS. 12A, 12B, and 12C illustrate a variety of aberrations of the zoom lens according to the sixth embodiment.
Figure 12B:
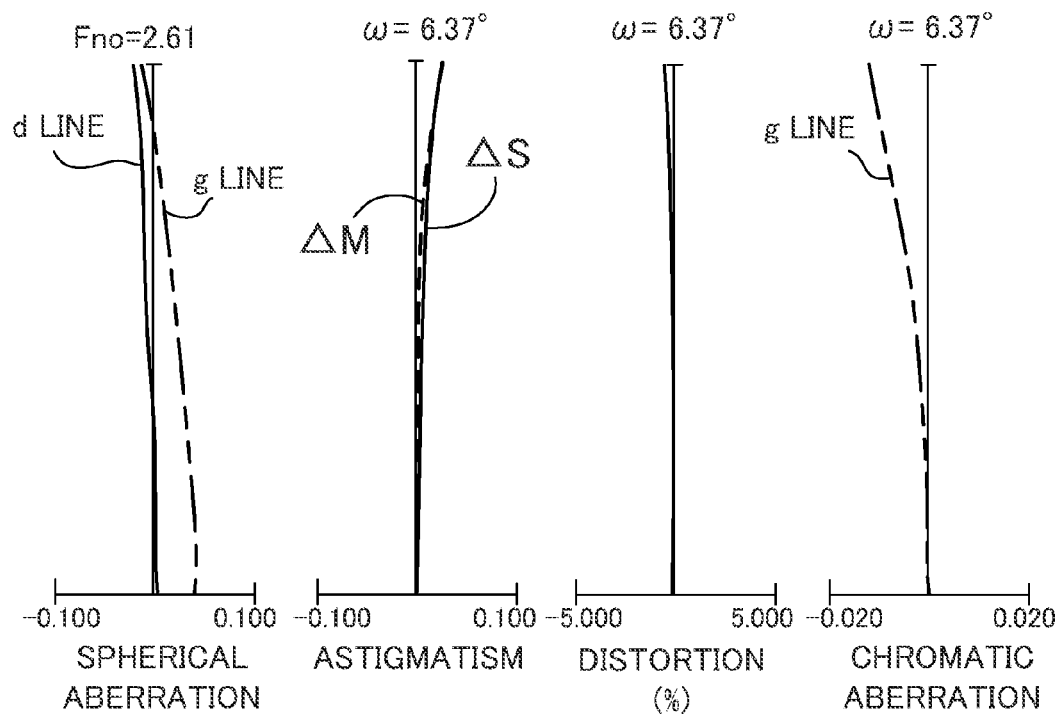
Figure 12C:
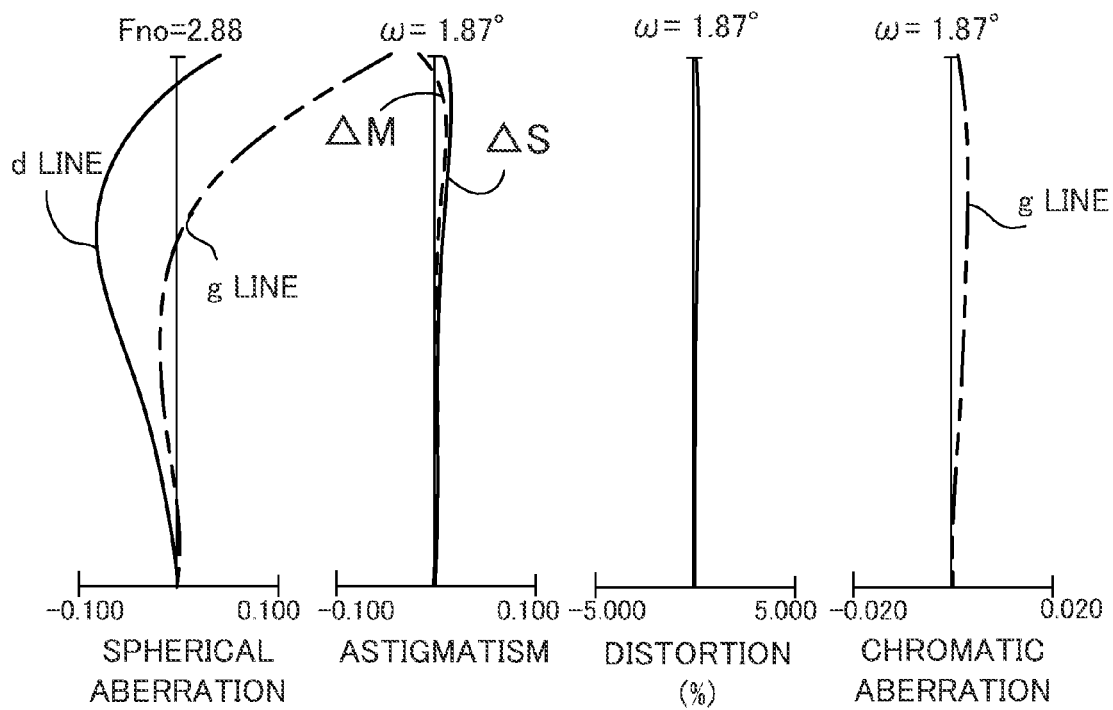
Figure 13:
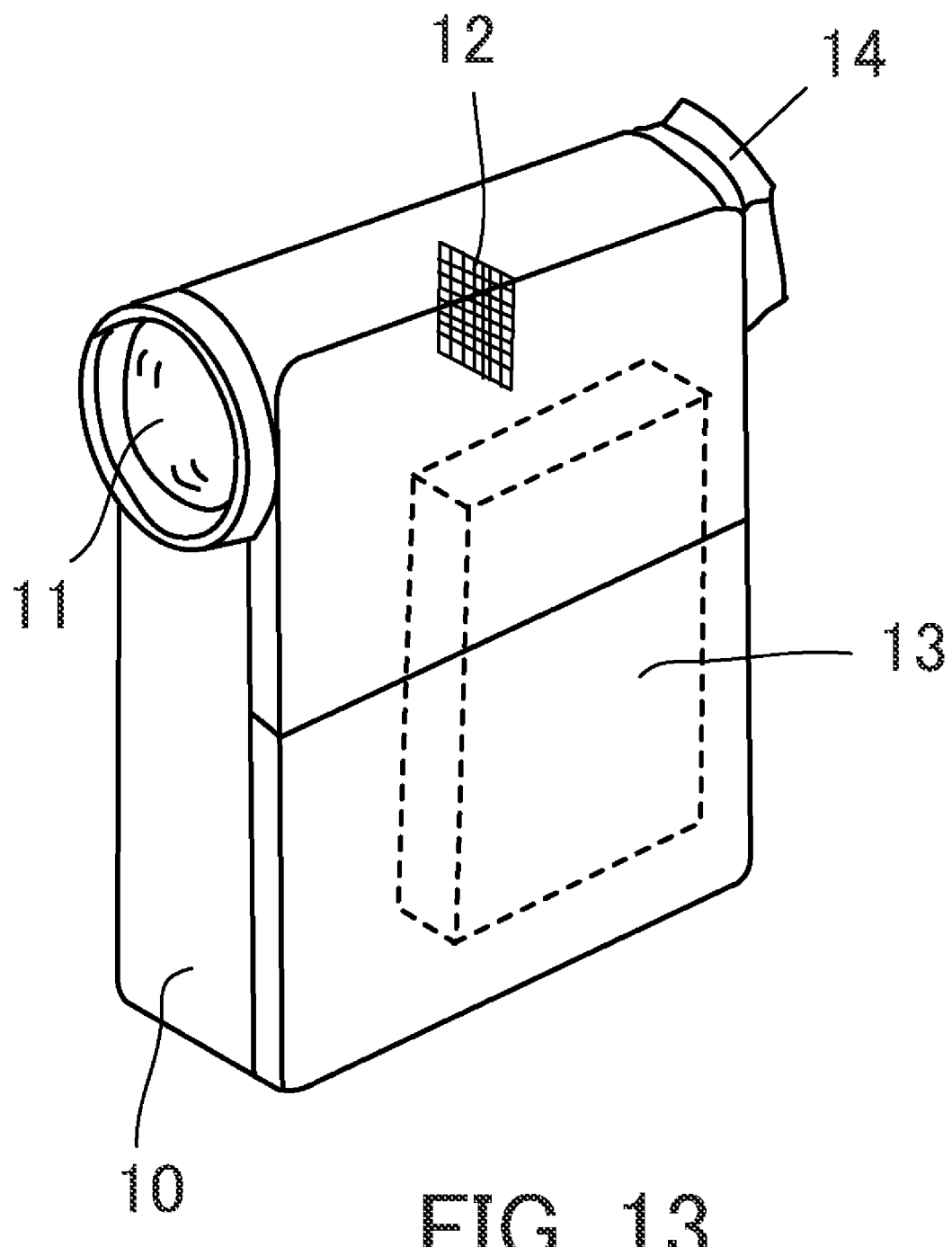
FIG. 13 is a schematic view of a principal part of an image pickup apparatus according to this invention.

FIG. 7 is a lens sectional view of a zoom lens according to a fourth embodiment. FIGS. 8A, 8B, and 8C are aberrational views on the wide angle end, the intermediate zoom position, and the telephoto end of the zoom lens according to the fourth embodiment. A zoom lens of a numerical example 4 has a zoom ratio of 9.79 and an image pickup angle of view of 75° on the wide angle end. FIG. 9 is a lens sectional view of a zoom lens according to a fifth embodiment. FIGS. 10A, 10B, and 10C are aberrational views on the wide angle end, the intermediate zoom position, and the telephoto end of the zoom lens according to the fifth embodiment. A zoom lens of a numerical example 5 has a zoom ratio of 9.79 and an image pickup angle of view of 82° on the wide angle end. FIG. 11 is a lens sectional view of a zoom lens according to a sixth embodiment. FIGS. 12A, 12B, and 12C are aberrational views on the wide angle end, the intermediate zoom position, and the telephoto end of the zoom lens according to the sixth embodiment. A zoom lens of a numerical example 6 has a zoom ratio of 21.0 and an image pickup angle of view of 69° on the wide angle end. FIG. 13 is a schematic view of a principal part of a video camera (image pickup apparatus) including the zoom lens according to this invention.

The zoom lens of each of the numerical examples 1-6 is an image pickup lens system used for the image pickup apparatus. In the lens sectional view, the left side denotes the object side and the right side denotes the image side. In the lens sectional view, L1 denotes a first lens unit of a positive refractive power. L2 denotes a second lens unit of a negative refractive power. L3 denotes a third lens unit of a positive refractive power. L4 denotes a fourth lens unit of a positive refractive power. SP denotes an aperture stop (stop). The stop SP is located on the object side of the third lens unit L3, and configured movable or fixed in the zooming.

G denotes an optical block corresponding to an optical filter or a face plate. IP denotes an image plane, corresponding to an image plane of an image pickup device, such as a CCD sensor or a CMOS sensor, when the zoom lens is used for the image pickup optical system of a digital still camera and a video camera or a film surface when the zoom lens is used for a film-based camera. In the aberrational diagram, a spherical aberration is illustrated for the d line and the g line. In the astigmatism diagram, $\Delta M$ and $\Delta S$ denote meridional plane and sagittal plane, respectively. The lateral chromatic aberration is illustrated for the g line. Fno denotes an F number, and $\omega$ denotes half an angle of view. In each of the following embodiments, a wide angle end and a telephoto end are zoom positions when the variable magnification lens unit (second lens unit) is located on both ends in its movable range on the optical axis on the mechanism.

In each embodiment, as illustrated by an arrow in the zooming from the wide angle end to the telephoto end, the second lens unit L2 is moved to the image side and the third lens unit L3 is nonlinearly moved to the object side for variable magnifications. In addition, the fourth lens unit L4 is moved to the image side along a convex locus so as to correct image plane fluctuations associated with the variable magnifications. Moreover the fourth lens unit L4 is moved on the optical axis for the rear focus type focusing. A curve 4a illustrated by a solid line and a curve 4b illustrated by a dotted line with respect to the fourth lens unit L4 are moving loci used to correct the image plane fluctuations associated with variable magnifications when an infinitely distant object is focused and when a short-distance object is focused. Thus, this embodiment forms a convex locus for the fourth lens unit L4 to the object side, efficiently utilizes a space between the third lens unit L3 and the forth lens unit L4, and effectively reduces the lens overall length.

In focusing from the infinitely distant object to the short-distance object on the telephoto end, the fourth lens unit L4 is moved ahead as illustrated by an arrow 4c. In the focusing, the first lens unit L1 is fixed in the optical axis direction, but may be moved if necessity arises in order to correct the aberration. In the image pickup, at least part of the third lens unit L3 is moved such that a movement direction thereof includes a component orthogonal to the optical axis to shift an image in a direction orthogonal to the optical axis. This configuration corrects a blur of the taken image when the zoom lens is moved.

In the fourth and fifth embodiments of FIGS. 7 and 9, the stop SP is moved to the object side in the zooming from the wide angle end to the intermediate zoom position and moved to the image side in the zooming from the intermediate zoom position to the telephoto end. Due to this movement, this embodiment efficiently utilizes a space between the second lens unit L2 and the third lens unit L3, and effectively reduces the lens overall length (a distance from the first lens surface to the image plane) and an effective diameter of the front lens.

The zoom lens in each embodiment specifies each component so that the effective diameter of the front lens can become smaller and the image angle can become wider. Since a zoom lens having a wide angle of view has a large ray angle incident upon the front lens (first lens surface), a distance from the first lens surface to the stop SP becomes an important factor for miniaturization of the zoom lens. For the miniaturization, the variable magnification is not allotted only to the second lens unit L2, but is allotted to both the second lens unit L2 and the third lens unit L3 for a reduction of a distance from the first lens surface to the stop SP and the effective diameter of the front lens. The zoom lens of each embodiment corresponds to a wide (image pickup) angle of view of 68° or larger, a high magnification (high zoom ratio) of about 10 to 20 times, and the overall system maintains a small length.

When an angle of view is made wider, in the zoom lens of each embodiment, the positive refractive power of the first lens unit generally becomes weaker by the amount of the widen angle of view. Hence, in order to obtain a variable magnification ratio (zoom ratio) only with the second lens unit L2, it is necessary to increase a movement amount of the second lens unit L2 associated with the zooming. However, the method of increasing the movement amount of the second lens unit L2 associated with the zooming and of obtaining the variable magnification requires a large movement space in the lens unit and a large interval between the front lens (first lens surface) and the stop SP. As a result, the effective diameter of the front lens increases. On the other hand, each embodiment reduces the movement amount of the second lens unit L2 associated with the zooming by making the third lens unit L3 the movable lens unit in the zooming and by allotting the variable magnification also to the third lens unit L3. Thus, a large effective diameter of the front lens is prevented.

Thus, for the high magnification (high zoom ratio), this embodiment allots the variable magnification both to the second lens unit L2 and the third lens unit L3, and minimizes the interval between the front lens and the stop SP, thereby preventing a large size of the effective diameter of the front lens.

More specifically, in each embodiment, the following conditions are satisfied where f3st is a movement amount of the third lens unit associated with zooming from a wide angle end to a telephoto end, f3 is a focal length of the third lens unit, β2w is a lateral magnification of the second lens unit at the wide angle end, and z is a zoom ratio:

$$0.010 < (|f3st|/f3)/z < 0.045 \quad (1)$$

$$-0.33 < \beta 2w < -0.20 \quad (2)$$

The movement amount f3st of the third lens unit L3 associated with the zooming from the wide angle end to the telephoto end is a positional difference of the third lens unit L3 to the image plane between the wide angle end and the telephoto end. In the zooming from the wide angle end to the telephoto end, a negative sign is set to a direction in which the third lens unit L3 is moved to the object side, and a positive sign is set to a direction in which the third lens unit L3 is moved to the image side. The same definition of the movement amount is applied to the following description:

The condition (1) is introduced to allot the variable magnification to the third lens unit L3 and to miniaturize the overall system. When a value is lower than the lower limit value of the condition (1), the movement amount of the third lens unit L3 in the zooming reduces and the variable magnification allotment of the second lens unit L2 and the effective diameter of the front lens increase although the value lower than the lower limit value is advantageous to the miniaturize of the lens overall length. When a value exceeds the upper limit value, the movement amount of the third lens unit L3 in the zooming increases, the lens overall length becomes longer, and the miniaturization becomes difficult. In addition, the power of the third lens unit L3 becomes stronger, and it is difficult to restrain the spherical aberration or the longitudinal chromatic aberration, particularly at the wide angle end.

The condition (2) relates to the lateral magnification of the second lens unit L2 at the wide angle end, and is introduced to properly correct the field curvature. When a value is lower than the lower limit value of the condition (2), the power of the second lens unit L2 becomes weaker, the movement amount becomes larger in the zooming, and it is difficult to miniaturize the overall system. On the other hand, when a value exceeds the upper limit value, the power of the second lens unit L2 becomes stronger, the fluctuation of the field curvature augments in the zooming, and it is difficult to mitigate the fluctuation.

In each embodiment, numerical values of the conditions (1) and (2) may be set as follows:

$$0.011 < (|f3st|/f3)/z < 0.043 \quad (1a)$$

$$-0.33 < \beta 2w < -0.21 \quad (2a)$$

The numerical values of (1a) and (2a) may be varied as follows:

$$0.012 < (|f3st|/f3)/z < 0.042 \quad (1b)$$

$$-0.32 < \beta 2w < -0.22 \quad (2b)$$

Each embodiment can obtain a compact zoom lens having a wide angle of view, a high zoom ratio, and a high optical performance over the entire zooming range. In each embodiment, one or more of the following conditions may be satisfied. Assume that f1 is a focal length of the first lens unit, f2st is a movement amount of the second lens unit associated with the zooming from the wide angle end to the telephoto end, f2 is a focal length of the second lens unit, and nd2 is an average refractive index of a material of each lens included in the second lens unit. At this time, one of the following conditions may be satisfied:

$$1.6 < f1/f3 < 2.7 \quad (3)$$

$$2.4 < |f2st/f2| < 3.8 \quad (4)$$

$$nd2 > 1.80 \quad (5)$$

A description will now be given of a technical meaning of each of the above conditions. The condition (3) relates to a power allotment among the first lens unit L1 and the third lens unit L3, and is introduced to properly correct the spherical aberration and the lateral chromatic aberration primarily at the telephoto end. When a value is lower than the lower limit of the condition (3), the power of the first lens unit L1 becomes stronger, it becomes easier to obtain a zoom ratio at the second lens unit L2, and this configuration is advantageous to the miniaturization of the overall system. However, it is difficult to properly correct the spherical aberration at the telephoto end in the high zoom ratio. On the other hand, when a value exceeds the upper limit value, the power of the first lens unit L1 becomes weaker, the longitudinal chromatic aberration is mitigated at the telephoto end, but a necessary movement amount of the second lens unit L2 increases to obtain a predetermined zoom ratio, and thus the miniaturization of the entire system becomes difficult.

The condition (4) relates to a power allotment of the second lens unit L2. When a value is lower than the lower limit value of the condition (4), the movement amount of the second lens unit L2 in the zooming becomes smaller, which is advantageous to the miniaturization of the effective diameter of the front lens. However, in order to obtain a predefined magnification, the movement amount of the third lens unit L3 becomes larger in the zooming and the lens overall length becomes larger. On the other hand, when a value exceeds the upper limit value, the movement amount of the second lens unit L2 in the zooming becomes larger and the effective diameter of the front lens becomes larger.

The condition (5) relates to an average refractive index of a material of the second lens unit L2, and is introduced to properly correct the field curvature. When a value is lower than the lower limit value of the condition (5), the Petzval sum expands in the minus direction, and it becomes difficult to restrain the fluctuation of the field curvature in the zooming. When the power of the second lens unit L2 becomes weaker in order to restrain the fluctuation of the field curvature, the lens overall length and the effective diameter of the front lens become larger.

In each embodiment, the numerical values of the conditions (3) to (5) may be varied as follows:

$$1.65 < f1/f3 < 2.65 \quad (3a)$$

$$2.5 < |f2st/f2| < 3.7 \quad (4a)$$

$$nd2 > 1.83 \quad (5a)$$

The numerical values of the conditions (3a), (4a), and (5a) may be further varied as follows:

$$1.7 < f1/f3 < 2.6 \quad (3b)$$

$$2.7 < |f2st/f2| < 3.5 \quad (4b)$$

$$1.83 < nd2 < 2.0 \quad (5b)$$

Each numerical example thus configures each lens unit so as to miniaturize the entire lens system, and to maintain a high optical performance over the entire zooming range or the entire object distance, although the lens configuration is simple.

In particular, each embodiment can provide a zoom lens corresponding to a wide angle of view of 68° or higher and a high magnification (zoom ratio) of about 10 to 20 times. Moreover, this embodiment can provide a zooming lens having a compact overall system and a high optical performance over the entire zooming range from the wide angle end to the telephoto end or over the entire object distance range from the infinitely distant object to the closest object. Each embodiment provides the aperture stop SP between the second lens unit L2 and the third lens unit L3, and can independently move the third lens unit L3 and the aperture stop SP in the zooming.

In general, in the wide angle of view and the high zoom ratio, a movement amount of a lens unit for the variable magnification increases in the zooming and thus it is important to approach the stop SP to the front side (first lens unit L1 side) so as to restrain the effective diameter of the front lens. Therefore, the zoom lenses of the fourth and fifth embodiments reduce the interval between the first lens unit and the stop SP at the focal length position used to determine the effective diameter of the front lens, and reduce the effective diameter of the front lens by moving the stop SP from the wide angle end to the intermediate zoom position toward the object side.

An entrance pupil position is made closer to the front lens side by arranging the stop SP on the object side of the third lens unit L3. In the zoom lens of each embodiment, an incident light flux used to determine the effective diameter of the front lens is available at a zoom position that is the wide angle end or slightly close to the telephoto end from the wide angle end. It is thus effective for the miniaturization of the effective diameter of the front lens to arrange the stop SP closest to the front lens side at that zoom position. In addition, by arranging the stop SP close to the front lens side at that zoom position, the axial light flux used to determine the F number at the wide angle end becomes smaller, the stop diameter can become smaller, and this configuration is consequently effective to a smaller lens configuration.

When the zoom lens of each embodiment is used for the image pickup apparatus, a unit configured to perform image processing may be provided so as to make an image circle size (diameter) at the wide angle end larger than that at the telephoto end. When the zoom lens of each embodiment is used for the image pickup apparatus, the distortion among a variety of aberrations may be corrected by electric image processing. In particular, the image pickup range at the wide angle end is made smaller than the maximum image pickup range (image circle size), and a further miniaturization of the effective diameter of the front lens becomes easier by correcting the distortion.

In the zoom lens of each embodiment, in the zooming from the wide angle end to the telephoto end, the first lens unit is configured fixed, whereas the second, third, and fourth lens units are configured movable. Thus, a high zoom ratio can be realized with a high performance, and a small number of movable lens units. In particular, the negative refractive power of the second lens unit L2 having a variable magnification action is made stronger, and a high variable magnification with a small movement amount can be realized with a high zoom ratio. When the negative refractive power of the second lens unit L2 is made stronger, the aberrational correction becomes difficult in the second lens unit L2. Nevertheless, the second lens unit L2 includes, in order from the object side to the image side, three negative lenses and is configured to properly adjust the refractive power of the second lens unit L2. Thereby, a high zoom ratio and a high performance can be realized.

In each embodiment, the first lens unit L1 includes, in order from an object side to an image side, a negative lens, a positive lens, and a positive lens. More specifically, the first lens unit L1 includes, in order from the object side to the image side, a negative lens, a positive lens having a convex surface on the object side, and a positive meniscus lens having a convex surface on the object side. The third lens unit L3 includes, in order from the object side to the image side, a positive lens, a negative lens, and a positive lens. The fourth lens unit L4 includes, in order from the object side to the image side, a cemented lens that is made by joining the positive lens and the negative lens.

By configuring each lens unit, this embodiment can provide a zoom lens corresponding to a wide angle of view of 68° or higher and a high (zoom) magnification of about 10 to 20 times. The zoom lens has a compact overall system, and a high optical performance over the entire zoom range from the wide angle end to the telephoto end or over the entire object distance from the infinitely distant object to the closest object.

A description will now be given of the numerical examples 1 to 6 corresponding to the first to sixth embodiments. In each numerical example, "i" denotes a surface number counted from the object side, "ri" denotes a radius of curvature of the i-th surface, "di" denotes an interval between the i-th surface and the i+1-th surface. "ndi" and "vdi" denote the refractive index and the Abbe number of a material of the i-th optical element for the d line. In the numerical examples 1 to 6, eight surfaces closest to the image side are planes corresponding to the optical block. The aspheric shape at a position having a height H from the optical axis is expressed by X as a displacement in the optical axis direction based on a surface vertex. The light traveling direction is set to the positive, where "R" denotes a paraxial radius of curvature, "k" denotes a conical coefficient, A4, A6, A8 are aspheric coefficients. This equation is expressed as follows:

$$x = \frac{H^2/R}{1+\sqrt{1-(1+k)(H/R)^2}} + A4H^4 + A6H^6 + A8H^8 \quad \text{Equation 1}$$

"*" denotes an aspheric surface. "e-x" denotes $10^{-x}$. "BF" denotes back focus. In each numerical example, the stop SP and the dummy surface are treated as one unit.

The eight planes closest to the image side also are regarded as one unit. Table 1 illustrates a relationship between each of the above conditions and a variety of numerical values in each numerical example.

NUMERICAL EXAMPLE 1

| SURFACE DATA | | | | | |
|---|---|---|---|---|---|
| SURFACE NUMBER | r | d | nd | vd | EFFECTIVE DIAMETER |
| 1 | 53.041 | 1.35 | 1.84666 | 23.9 | 33.00 |
| 2 | 27.668 | 6.05 | 1.60311 | 60.6 | 29.80 |
| 3 | −440.882 | 0.18 | | | 28.80 |
| 4 | 24.922 | 3.45 | 1.69680 | 55.5 | 25.20 |
| 5 | 74.134 | (VARIABLE) | | | 24.30 |
| 6 | 147.266 | 0.70 | 1.88300 | 40.8 | 14.60 |

-continued

| | | | | | |
|---|---|---|---|---|---|
| 7 | 7.285 | 2.97 | | | 10.90 |
| 8 | −111.952 | 0.60 | 1.80610 | 33.3 | 10.70 |
| 9 | 29.523 | 1.22 | | | 10.40 |
| 10 | −25.404 | 0.60 | 1.80400 | 46.6 | 10.40 |
| 11 | 40.496 | 0.27 | | | 10.50 |
| 12 | 20.278 | 1.94 | 1.92286 | 18.9 | 10.80 |
| 13 | −54.086 | (VARIABLE) | | | 10.70 |
| 14 | ∞ | 0.00 | | | 8.65 |
| 15 (STOP) | ∞ | (VARIABLE) | | | 8.65 |
| 16* | 10.402 | 3.01 | 1.58313 | 59.4 | 10.40 |
| 17 | −129.903 | 4.39 | | | 10.00 |
| 18 | 56.301 | 0.60 | 1.80518 | 25.4 | 8.10 |
| 19 | 10.489 | 0.59 | | | 7.80 |
| 20* | 21.401 | 2.23 | 1.58313 | 59.4 | 8.00 |
| 21 | −36.073 | (VARIABLE) | | | 8.30 |
| 22 | 13.790 | 3.07 | 1.69680 | 55.5 | 9.40 |
| 23 | −22.255 | 1.10 | 1.84666 | 23.9 | 9.10 |
| 24 | −236.089 | (VARIABLE) | | | 8.90 |
| 25 | ∞ | 0.19 | 1.54400 | 60.0 | 20.00 |
| 26 | ∞ | 0.26 | 1.54400 | 60.0 | 20.00 |
| 27 | ∞ | 0.80 | 1.51400 | 70.0 | 20.00 |
| 28 | ∞ | 0.19 | 1.54400 | 60.0 | 20.00 |
| 29 | ∞ | 1.00 | | | 20.00 |
| 30 | ∞ | 0.50 | 1.49000 | 70.0 | 20.00 |
| 31 | ∞ | 1.00 | | | 20.00 |
| 32 | ∞ | (VARIABLE) | | | 20.00 |
| IMAGE PLANE | ∞ | | | | |

ASPHERIC DATA

SIXTEENTH SURFACE $K = -8.66524e-001$   $A4 = -1.99723e-006$   $A6 = 7.05266e-008$
$A8 = 6.79053e-010$

TWENTIETH SURFACE $K = -4.10770e-001$   $A4 = -2.43478e-005$   $A6 = 1.73933e-008$
$A8 = -1.14367e-011$

A VARIETY OF TYPES OF DATA
ZOOM RATIO 9.81

| | | | |
|---|---|---|---|
| FOCAL LENGTH | 4.63 | 20.22 | 45.45 |
| F NUMBER | 1.85 | 2.61 | 2.88 |
| HALF ANGLE OF VIEW | 34.50 | 8.95 | 4.01 |
| IMAGE HEIGHT | 3.19 | 3.19 | 3.19 |
| LENS OVERALL LENGTH | 78.39 | 78.39 | 78.39 |
| BF | 9.14 | 13.16 | 11.56 |
| d5 | 1.01 | 16.10 | 21.46 |
| d13 | 22.93 | 7.84 | 2.48 |
| d15 | 6.40 | 2.56 | 2.25 |
| d21 | 4.60 | 4.42 | 6.33 |
| d24 | 5.87 | 9.88 | 8.29 |
| ENTRANCE PUPIL POSITION | 19.28 | 85.33 | 164.38 |
| EXIT PUPIL POSITION | 3663.98 | −74.97 | −105.06 |
| FRONT PRINCIPAL POINT POSITION | 23.92 | 100.09 | 190.17 |
| BACK PRINCIPAL POINT POSITION | −4.64 | −20.22 | −45.45 |

ZOOM LENS UNIT DATA

| UNIT | STARTING SURFACE | FOCAL LENGTH | LENS OVERALL LENGTH | FRONT PRINCIPAL POINT POSITION | BACK PRINCIPAL POINT POSITION |
|---|---|---|---|---|---|
| 1 | 1 | 36.96 | 11.03 | 2.61 | −4.16 |
| 2 | 6 | −7.42 | 8.30 | 0.39 | −6.55 |
| 3 | 14 | ∞ | 0.00 | 0.00 | −0.00 |
| 4 | 16 | 21.11 | 10.82 | −1.21 | −9.73 |
| 5 | 22 | 21.02 | 4.17 | −0.07 | −2.48 |
| 6 | 25 | ∞ | 3.94 | 1.64 | −1.64 |

SINGLE LENS DATA

| LENS | STARTING SURFACE | FOCAL LENGTH |
|---|---|---|
| 1 | 1 | −70.02 |
| 2 | 2 | 43.38 |
| 3 | 4 | 52.37 |
| 4 | 6 | −8.70 |
| 5 | 8 | −28.93 |
| 6 | 10 | −19.34 |
| 7 | 12 | 16.18 |
| 8 | 16 | 16.65 |
| 9 | 18 | −16.10 |
| 10 | 20 | 23.37 |
| 11 | 22 | 12.66 |
| 12 | 23 | −29.09 |

NUMERICAL EXAMPLE 2

SURFACE DATA

| SURFACE NUMBER | r | d | nd | vd | EFFECTIVE DIAMETER |
|---|---|---|---|---|---|
| 1 | 58.332 | 1.35 | 1.84666 | 23.9 | 32.71 |
| 2 | 30.014 | 5.95 | 1.60311 | 60.6 | 30.55 |
| 3 | −346.123 | 0.18 | | | 29.74 |
| 4 | 26.455 | 3.41 | 1.69680 | 55.5 | 26.23 |
| 5 | 73.102 | (VARIABLE) | | | 25.29 |
| 6 | 111.783 | 0.70 | 1.88300 | 40.8 | 14.38 |
| 7 | 7.319 | 3.18 | | | 10.88 |
| 8 | −40.681 | 0.60 | 1.80610 | 33.3 | 10.66 |
| 9 | 32.642 | 1.21 | | | 10.44 |
| 10 | −24.800 | 0.60 | 1.80400 | 46.6 | 10.43 |
| 11 | 233.561 | 0.10 | | | 10.63 |
| 12 | 23.740 | 1.93 | 1.92286 | 18.9 | 10.86 |
| 13 | −44.341 | (VARIABLE) | | | 10.81 |
| 14 (STOP) | ∞ | (VARIABLE) | | | 8.69 |
| 15* | 9.606 | 3.09 | 1.58313 | 59.4 | 10.24 |
| 16 | −108.880 | 4.17 | | | 9.80 |
| 17 | 40.285 | 0.60 | 1.80518 | 25.4 | 8.20 |
| 18 | 8.806 | 0.61 | | | 7.96 |
| 19* | 17.286 | 2.10 | 1.58313 | 59.4 | 8.03 |
| 20 | −122.311 | (VARIABLE) | | | 8.28 |
| 21 | 12.947 | 3.06 | 1.69680 | 55.5 | 9.22 |
| 22 | −23.084 | 1.00 | 1.84666 | 23.9 | 8.89 |
| 23 | −168.951 | (VARIABLE) | | | 8.69 |
| 24 | ∞ | 0.31 | 1.54400 | 60.0 | 20.00 |
| 25 | ∞ | 1.00 | 1.51400 | 70.0 | 20.00 |
| 26 | ∞ | 0.26 | 1.54400 | 60.0 | 20.00 |
| 27 | ∞ | 0.31 | 1.54400 | 60.0 | 20.00 |
| 28 | ∞ | 1.15 | | | 20.00 |
| 29 | ∞ | 0.50 | 1.49000 | 70.0 | 20.00 |
| 30 | ∞ | 0.48 | | | 20.00 |
| 31 | ∞ | (VARIABLE) | | | 20.00 |
| IMAGE PLANE | ∞ | | | | |

ASPHERIC DATA

FIFTEENTH SURFACE $K = -8.27323e-001$   $A4 = 5.43055e-006$   $A6 = 1.08902e-007$
$A8 = -9.01539e-010$

NINETEENTH SURFACE $K = -2.21028e-001$   $A4 = -3.76064e-005$

A VARIETY OF TYPES OF DATA
ZOOM RATIO 11.78

| | | | |
|---|---|---|---|
| FOCAL LENGTH | 4.37 | 21.00 | 51.42 |
| F NUMBER | 1.85 | 2.61 | 2.88 |
| HALF ANGLE OF VIEW | 34.49 | 8.13 | 3.34 |
| IMAGE HEIGHT | 3.00 | 3.00 | 3.00 |
| LENS OVERALL LENGTH | 79.69 | 79.69 | 79.69 |
| BF | 8.85 | 12.74 | 10.38 |
| d5 | 0.94 | 18.37 | 24.59 |
| d13 | 26.18 | 8.75 | 2.53 |
| d14 | 6.38 | 2.43 | 2.24 |

-continued

| | | | |
|---|---|---|---|
| d20 | 3.50 | 3.56 | 6.11 |
| d23 | 5.63 | 9.52 | 7.16 |
| ENTRANCE PUPIL POSITION | 19.03 | 95.84 | 200.22 |
| EXIT PUPIL POSITION | −205.85 | −57.21 | −95.71 |
| FRONT PRINCIPAL POINT POSITION | 23.31 | 109.14 | 224.02 |
| BACK PRINCIPAL POINT POSITION | −4.35 | −20.98 | −51.40 |

ZOOM LENS UNIT DATA

| UNIT | STARTING SURFACE | FOCAL LENGTH | LENS OVER-ALL LENGTH | FRONT PRINCIPAL POINT POSITION | BACK PRINCIPAL POINT POSITION |
|---|---|---|---|---|---|
| 1 | 1 | 39.98 | 10.89 | 2.52 | −4.14 |
| 2 | 6 | −7.91 | 8.32 | 0.21 | −6.93 |
| 3 | 14 | ∞ | 0.00 | 0.00 | −0.00 |
| 4 | 15 | 21.79 | 10.56 | −3.56 | −10.66 |
| 5 | 21 | 19.10 | 4.06 | 0.00 | −2.35 |
| 6 | 24 | ∞ | 4.01 | 1.60 | −1.60 |

SINGLE LENS DATA

| LENS | STARTING SURFACE | FOCAL LENGTH |
|---|---|---|
| 1 | 1 | −74.65 |
| 2 | 2 | 46.07 |
| 3 | 4 | 57.76 |
| 4 | 6 | −8.90 |
| 5 | 8 | −22.38 |
| 6 | 10 | −27.86 |
| 7 | 12 | 16.99 |
| 8 | 15 | 15.28 |
| 9 | 17 | −14.12 |
| 10 | 19 | 26.12 |
| 11 | 21 | 12.33 |
| 12 | 22 | −31.68 |

NUMERICAL EXAMPLE 3

SURFACE DATA

| SURFACE NUMBER | r | d | nd | vd | EFFECTIVE DIAMETER |
|---|---|---|---|---|---|
| 1 | 58.055 | 1.35 | 1.84666 | 23.9 | 31.94 |
| 2 | 30.837 | 6.05 | 1.60311 | 60.6 | 29.98 |
| 3 | −316.361 | 0.18 | | | 29.01 |
| 4 | 26.910 | 3.40 | 1.69680 | 55.5 | 27.35 |
| 5 | 69.580 | (VARIABLE) | | | 26.76 |
| 6 | 136.315 | 0.70 | 1.88300 | 40.8 | 14.20 |
| 7 | 7.214 | 3.16 | | | 10.75 |
| 8 | −50.295 | 0.60 | 1.80610 | 33.3 | 10.52 |
| 9 | 35.547 | 0.90 | | | 10.31 |
| 10 | −26.926 | 0.60 | 1.80400 | 46.6 | 10.31 |
| 11 | 61.991 | 0.08 | | | 10.50 |
| 12 | 19.958 | 1.88 | 1.92286 | 18.9 | 10.73 |
| 13 | −60.936 | (VARIABLE) | | | 10.67 |
| 14 (STOP) | ∞ | (VARIABLE) | | | 9.49 |
| 15* | 10.411 | 3.48 | 1.58313 | 59.4 | 11.60 |
| 16 | −39.102 | 5.20 | | | 11.20 |
| 17 | −158.764 | 0.60 | 1.80518 | 25.4 | 8.89 |
| 18 | 8.539 | 0.44 | | | 8.60 |
| 19* | 13.856 | 2.34 | 1.58313 | 59.4 | 8.57 |
| 20 | −75.807 | (VARIABLE) | | | 8.84 |
| 21 | 15.612 | 2.33 | 1.69680 | 55.5 | 10.16 |
| 22 | −43.920 | 1.00 | 1.84666 | 23.9 | 9.97 |
| 23 | −51.313 | (VARIABLE) | | | 9.84 |
| 24 | ∞ | 0.31 | 1.54400 | 60.0 | 20.00 |
| 25 | ∞ | 1.00 | 1.51400 | 70.0 | 20.00 |
| 26 | ∞ | 0.26 | 1.54400 | 60.0 | 20.00 |
| 27 | ∞ | 0.31 | 1.54400 | 60.0 | 20.00 |
| 28 | ∞ | 1.15 | | | 20.00 |
| 29 | ∞ | 0.50 | 1.49000 | 70.0 | 20.00 |
| 30 | ∞ | 0.48 | | | 20.00 |
| 31 | ∞ | (VARIABLE) | | | 20.00 |
| IMAGE PLANE | ∞ | | | | |

ASPHERIC DATA

FIFTEENTH SURFACE

K = −1.15201e+000  A4 = 2.01901e−005  A6 = −1.58643e−007
A8 = −9.01539e−010

NINETEENTH SURFACE

K = 4.09719e+000  A4 = −1.96998e−004  A6 = −2.35577e−006

A VARIETY OF TYPES OF DATA
ZOOM RATIO 19.40

| | | | |
|---|---|---|---|
| FOCAL LENGTH | 4.37 | 25.51 | 84.70 |
| F NUMBER | 1.85 | 2.61 | 2.88 |
| HALF ANGLE OF VIEW | 34.49 | 6.71 | 2.03 |
| IMAGE HEIGHT | 3.00 | 3.00 | 3.00 |
| LENS OVERALL LENGTH | 86.75 | 86.75 | 86.75 |
| BF | 9.22 | 15.19 | 8.72 |
| d5 | 1.00 | 19.96 | 26.72 |
| d13 | 27.90 | 8.94 | 2.18 |
| d14 | 9.16 | 2.40 | 2.24 |
| d20 | 5.20 | 5.99 | 12.61 |
| d23 | 6.00 | 11.97 | 5.50 |
| ENTRANCE PUPIL POSITION | 19.11 | 111.46 | 269.61 |
| EXIT PUPIL POSITION | 84.87 | −191.69 | 71.39 |
| FRONT PRINCIPAL POINT POSITION | 23.70 | 133.58 | 454.83 |
| BACK PRINCIPAL POINT POSITION | −4.35 | −25.49 | −84.68 |

ZOOM LENS UNIT DATA

| UNIT | STARTING SURFACE | FOCAL LENGTH | LENS OVER-ALL LENGTH | FRONT PRINCIPAL POINT POSITION | BACK PRINCIPAL POINT POSITION |
|---|---|---|---|---|---|
| 1 | 1 | 40.72 | 10.98 | 2.44 | −4.27 |
| 2 | 6 | −7.49 | 7.91 | 0.42 | −6.05 |
| 3 | 14 | ∞ | 0.00 | 0.00 | −0.00 |
| 4 | 15 | 22.98 | 12.06 | −6.61 | −13.16 |
| 5 | 21 | 17.68 | 3.33 | 0.48 | −1.48 |
| 6 | 24 | ∞ | 4.01 | 1.60 | −1.60 |

SINGLE LENS DATA

| LENS | STARTING SURFACE | FOCAL LENGTH |
|---|---|---|
| 1 | 1 | −79.49 |
| 2 | 2 | 46.90 |
| 3 | 4 | 60.98 |
| 4 | 6 | −8.65 |
| 5 | 8 | −25.76 |
| 6 | 10 | −23.28 |
| 7 | 12 | 16.47 |
| 8 | 15 | 14.47 |
| 9 | 17 | −10.05 |
| 10 | 19 | 20.29 |
| 11 | 21 | 16.80 |
| 12 | 22 | −383.82 |

NUMERICAL EXAMPLE 4

SURFACE DATA

| SURFACE NUMBER | r | d | nd | vd | EFFECTIVE DIAMETER |
|---|---|---|---|---|---|
| 1 | 55.796 | 1.80 | 1.84666 | 23.9 | 38.80 |
| 2 | 32.207 | 6.50 | 1.60311 | 60.6 | 35.32 |

-continued

| | | | | | |
|---|---|---|---|---|---|
| 3 | 889.522 | 0.20 | | | 34.09 |
| 4 | 32.514 | 3.26 | 1.69680 | 55.5 | 29.16 |
| 5 | 89.238 | (VARIABLE) | | | 28.56 |
| 6 | 70.612 | 1.00 | 1.88300 | 40.8 | 18.93 |
| 7 | 8.160 | 3.96 | | | 13.38 |
| 8 | 169.349 | 0.85 | 1.80610 | 33.3 | 13.02 |
| 9 | 17.698 | 2.08 | | | 12.37 |
| 10 | −27.858 | 0.80 | 1.80400 | 46.6 | 12.35 |
| 11 | 86.365 | 0.09 | | | 12.65 |
| 12 | 23.231 | 2.33 | 1.92286 | 18.9 | 12.99 |
| 13 | −66.340 | (VARIABLE) | | | 12.93 |
| 14 (STOP) | ∞ | (VARIABLE) | | | 8.15 |
| 15* | 12.888 | 2.94 | 1.58313 | 59.4 | 11.61 |
| 16 | −151.329 | 5.31 | | | 11.29 |
| 17 | 1337.235 | 0.80 | 1.80518 | 25.4 | 9.21 |
| 18 | 14.239 | 0.19 | | | 8.89 |
| 19* | 16.466 | 2.44 | 1.58313 | 59.4 | 8.93 |
| 20 | −30.911 | (VARIABLE) | | | 9.25 |
| 21 | 22.924 | 2.21 | 1.69680 | 55.5 | 9.99 |
| 22 | −28.432 | 0.80 | 1.84666 | 23.9 | 9.88 |
| 23 | −115.180 | (VARIABLE) | | | 9.82 |
| 24 | ∞ | 0.19 | 1.54400 | 60.0 | 20.00 |
| 25 | ∞ | 0.26 | 1.54400 | 60.0 | 20.00 |
| 26 | ∞ | 0.80 | 1.51400 | 70.0 | 20.00 |
| 27 | ∞ | 0.19 | 1.54400 | 60.0 | 20.00 |
| 28 | ∞ | 1.00 | | | 20.00 |
| 29 | ∞ | 0.50 | 1.49000 | 70.0 | 20.00 |
| 30 | ∞ | 1.00 | | | 20.00 |
| 31 | ∞ | (VARIABLE) | | | 20.00 |
| IMAGE PLANE | ∞ | | | | |

ASPHERIC DATA

FIFTEENTH SURFACE

K = −1.46246e+000   A4 = 3.98811e−005   A6 = −2.10269e−009
A8 = 1.14020e−011

NINETEENTH SURFACE

K = −9.97784e−001   A4 = −4.36903e−005

A VARIETY OF TYPES OF DATA
ZOOM RATIO 9.79

| | | | |
|---|---|---|---|
| FOCAL LENGTH | 4.53 | 21.95 | 44.31 |
| F NUMBER | 1.85 | 2.62 | 2.88 |
| HALF ANGLE OF VIEW | 37.49 | 8.99 | 4.48 |
| IMAGE HEIGHT | 3.47 | 3.47 | 3.47 |
| LENS OVERALL LENGTH | 91.33 | 91.33 | 91.33 |
| BF | 10.34 | 16.76 | 16.86 |
| d5 | 0.68 | 21.09 | 28.26 |
| d13 | 21.09 | 5.35 | 2.70 |
| d14 | 15.74 | 5.05 | 2.35 |
| d20 | 5.91 | 5.51 | 3.60 |
| d23 | 7.07 | 13.50 | 13.59 |
| d31 | −0.01 | −0.01 | −0.01 |
| ENTRANCE PUPIL POSITION | 19.92 | 95.32 | 190.15 |
| EXIT PUPIL POSITION | 35.54 | −107.92 | −54.62 |
| FRONT PRINCIPAL POINT POSITION | 25.02 | 112.80 | 198.51 |
| BACK PRINCIPAL POINT POSITION | −4.54 | −21.96 | −44.32 |

ZOOM LENS UNIT DATA

| UNIT | STARTING SURFACE | FOCAL LENGTH | LENS OVER-ALL LENGTH | FRONT PRINCIPAL POINT POSITION | BACK PRINCIPAL POINT POSITION |
|---|---|---|---|---|---|
| 1 | 1 | 48.86 | 11.76 | 2.32 | −4.90 |
| 2 | 6 | −8.44 | 11.11 | 0.78 | −8.58 |
| 3 | 14 | ∞ | 0.00 | 0.00 | −0.00 |
| 4 | 15 | 21.48 | 11.68 | 0.90 | −9.07 |
| 5 | 21 | 30.95 | 3.0 | 0.18 | −1.57 |
| 6 | 24 | ∞ | 3.94 | 1.64 | −1.64 |

SINGLE LENS DATA

| LENS | STARTING SURFACE | FOCAL LENGTH |
|---|---|---|
| 1 | 1 | −93.24 |
| 2 | 2 | 55.25 |
| 3 | 4 | 71.71 |
| 4 | 6 | −10.53 |
| 5 | 8 | −24.58 |
| 6 | 10 | −26.12 |
| 7 | 12 | 18.88 |
| 8 | 15 | 20.50 |
| 9 | 17 | −17.88 |
| 10 | 19 | 18.78 |
| 11 | 21 | 18.54 |
| 12 | 22 | −44.78 |

NUMERICAL EXAMPLE 5

SURFACE DATA

| SURFACE NUMBER | r | d | nd | vd | EFFECTIVE DIAMETER |
|---|---|---|---|---|---|
| 1 | 55.044 | 1.80 | 1.84666 | 23.9 | 47.30 |
| 2 | 32.377 | 7.98 | 1.60311 | 60.6 | 41.76 |
| 3 | 384.477 | 0.20 | | | 40.60 |
| 4 | 29.483 | 3.37 | 1.69680 | 55.5 | 29.54 |
| 5 | 70.172 | (VARIABLE) | | | 28.37 |
| 6 | 53.719 | 1.00 | 1.88300 | 40.8 | 21.77 |
| 7 | 8.281 | 4.02 | | | 14.43 |
| 8 | 65.026 | 0.85 | 1.80610 | 33.3 | 14.26 |
| 9 | 14.683 | 2.24 | | | 13.14 |
| 10 | −29.241 | 0.80 | 1.80400 | 46.6 | 13.15 |
| 11 | 58.250 | 0.12 | | | 13.31 |
| 12 | 21.358 | 2.23 | 1.92286 | 18.9 | 13.60 |
| 13 | −90.257 | (VARIABLE) | | | 13.47 |
| 14 (STOP) | ∞ | (VARIABLE) | | | 7.99 |
| 15* | 12.709 | 3.22 | 1.58313 | 59.4 | 10.60 |
| 16 | −213.627 | 4.58 | | | 10.21 |
| 17 | 111.036 | 0.80 | 1.80518 | 25.4 | 9.32 |
| 18 | 14.346 | 0.44 | | | 9.30 |
| 19* | 17.010 | 2.46 | 1.58313 | 59.4 | 9.47 |
| 20 | −30.355 | (VARIABLE) | | | 9.72 |
| 21 | 21.876 | 2.45 | 1.69680 | 55.5 | 10.46 |
| 22 | −23.378 | 0.80 | 1.84666 | 23.9 | 10.30 |
| 23 | −187.189 | (VARIABLE) | | | 10.20 |
| 24 | ∞ | 0.19 | 1.54400 | 60.0 | 20.00 |
| 25 | ∞ | 0.26 | 1.54400 | 60.0 | 20.00 |
| 26 | ∞ | 0.80 | 1.51400 | 70.0 | 20.00 |
| 27 | ∞ | 0.19 | 1.54400 | 60.0 | 20.00 |
| 28 | ∞ | 1.00 | | | 20.00 |
| 29 | ∞ | 0.50 | 1.49000 | 70.0 | 20.00 |

-continued

| | | | | |
|---|---|---|---|---|
| 30 | ∞ | 1.00 | | 20.00 |
| 31 | ∞ | (VARIABLE) | | 20.00 |
| IMAGE PLANE | ∞ | | | |

ASPHERIC DATA

FIFTEENTH SURFACE

K = −1.10400e+000   A4 = 1.25699e−005   A6 = 4.59169e−008
A8 = 1.14020e−011

NINETEENTH SURFACE

K = −1.35359e+000   A4 = −3.00917e−005   A6 = 3.13643e−008

A VARIETY OF TYPES OF DATA
ZOOM RATIO 9.79

| | | | |
|---|---|---|---|
| FOCAL LENGTH | 3.97 | 20.23 | 38.90 |
| F NUMBER | 1.85 | 2.62 | 2.88 |
| HALF ANGLE OF VIEW | 41.16 | 9.74 | 5.10 |
| IMAGE HEIGHT | 3.47 | 3.47 | 3.47 |
| LENS OVERALL LENGTH | 92.04 | 92.04 | 92.04 |
| BF | 10.05 | 15.06 | 16.94 |
| d5 | 0.68 | 19.89 | 26.64 |
| d13 | 22.99 | 4.30 | 2.18 |
| d14 | 15.41 | 6.00 | 2.24 |
| d20 | 3.54 | 7.43 | 4.67 |
| d23 | 6.77 | 11.79 | 13.66 |
| d31 | −0.00 | −0.00 | −0.00 |
| ENTRANCE PUPIL POSITION | 21.96 | 88.67 | 161.04 |
| EXIT PUPIL POSITION | 31.33 | −226.62 | −58.41 |
| FRONT PRINCIPAL POINT POSITION | 26.44 | 107.10 | 174.04 |
| BACK PRINCIPAL POINT POSITION | −3.97 | −20.23 | −38.90 |

ZOOM LENS UNIT DATA

| UNIT | STARTING SURFACE | FOCAL LENGTH | LENS OVER-ALL LENGTH | FRONT PRINCIPAL POINT POSITION | BACK PRINCIPAL POINT POSITION |
|---|---|---|---|---|---|
| 1 | 1 | 50.01 | 13.35 | 2.5 | −5.66 |
| 2 | 6 | −8.26 | 11.26 | 1.11 | −8.21 |
| 3 | 14 | ∞ | 0.00 | 0.00 | −0.00 |
| 4 | 15 | 19.98 | 11.50 | 1.97 | −8.11 |
| 5 | 21 | 33.33 | 3.25 | −0.02 | −1.90 |
| 6 | 24 | ∞ | 3.94 | 1.64 | −1.64 |

SINGLE LENS DATA

| LENS | STARTING SURFACE | FOCAL LENGTH |
|---|---|---|
| 1 | 1 | −96.37 |
| 2 | 2 | 58.12 |
| 3 | 4 | 70.57 |
| 4 | 6 | −11.20 |
| 5 | 8 | −23.71 |
| 6 | 10 | −24.12 |
| 7 | 12 | 18.90 |
| 8 | 15 | 20.68 |
| 9 | 17 | −20.54 |
| 10 | 19 | 19.06 |
| 11 | 21 | 16.59 |
| 12 | 22 | −31.62 |

NUMERICAL EXAMPLE 6

SURFACE DATA

| SURFACE NUMBER | r | d | nd | vd | EFFECTIVE DIAMETER |
|---|---|---|---|---|---|
| 1 | 57.988 | 1.35 | 1.84666 | 23.9 | 32.48 |
| 2 | 30.819 | 6.04 | 1.60311 | 60.6 | 30.94 |
| 3 | −324.997 | 0.18 | | | 30.75 |
| 4 | 26.823 | 3.48 | 1.69680 | 55.5 | 29.44 |
| 5 | 68.066 | (VARIABLE) | | | 29.01 |
| 6 | 104.465 | 0.70 | 1.88300 | 40.8 | 14.32 |
| 7 | 7.051 | 3.43 | | | 10.74 |
| 8 | −61.146 | 0.60 | 1.83481 | 42.7 | 10.39 |
| 9 | 44.846 | 0.83 | | | 10.20 |
| 10 | −26.683 | 0.60 | 1.80400 | 46.6 | 10.19 |
| 11 | 51.085 | 0.05 | | | 10.33 |
| 12 | 18.984 | 1.79 | 1.92286 | 18.9 | 10.52 |
| 13 | −101.633 | (VARIABLE) | | | 10.42 |
| 14(STOP) | ∞ | (VARIABLE) | | | 9.77 |
| 15* | 10.654 | 3.45 | 1.58313 | 59.4 | 11.93 |
| 16 | −36.872 | 5.20 | | | 11.59 |
| 17 | 51.015 | 0.60 | 1.80518 | 25.4 | 8.72 |
| 18 | 6.982 | 0.48 | | | 8.30 |
| 19* | 9.565 | 2.44 | 1.58313 | 59.4 | 8.45 |
| 20 | 51.062 | (VARIABLE) | | | 8.56 |
| 21 | 15.217 | 2.19 | 1.69680 | 55.5 | 9.79 |
| 22 | −68.564 | 1.00 | 1.84666 | 23.9 | 9.61 |
| 23 | −66.242 | (VARIABLE) | | | 9.47 |
| 24 | ∞ | 0.31 | 1.54400 | 60.0 | 20.00 |
| 25 | ∞ | 1.00 | 1.51400 | 70.0 | 20.00 |
| 26 | ∞ | 0.26 | 1.54400 | 60.0 | 20.00 |
| 27 | ∞ | 0.31 | 1.54400 | 60.0 | 20.00 |
| 28 | ∞ | 1.15 | | | 20.00 |
| 29 | ∞ | 0.50 | 1.49000 | 70.0 | 20.00 |

-continued

| | | | | |
|---|---|---|---|---|
| 30 | ∞ | 0.48 | | 20.00 |
| 31 | ∞ | (VARIABLE) | | 20.00 |
| IMAGE PLANE | ∞ | | | |

ASPHERIC DATA

FIFTEENTH SURFACE

K = −1.20929e+000  A 4 = 7.62696e−006  A 6 = −2.31839e−007
A 8 = −9.01539e−010

NINETEENTH SURFACE

K = 1.65150e+000  A 4 = −1.66367e−004  A 6 = −2.00848e−006

A VARIETY OF TYPES OF DATA
ZOOM RATIO 21.00

| | | | |
|---|---|---|---|
| FOCAL LENGTH | 4.37 | 26.89 | 91.70 |
| F NUMBER | 1.85 | 2.61 | 2.88 |
| HALF ANGLE OF VIEW | 34.49 | 6.37 | 1.87 |
| IMAGE HEIGHT | 3.00 | 3.00 | 3.00 |
| LENS OVERALL LENGTH | 86.89 | 86.89 | 86.89 |
| BF | 9.22 | 16.05 | 8.72 |
| d 5 | 1.00 | 20.23 | 27.08 |
| d13 | 28.26 | 9.04 | 2.18 |
| d14 | 8.80 | 2.40 | 2.24 |
| d20 | 5.20 | 4.77 | 12.26 |
| d23 | 6.00 | 12.83 | 5.50 |
| ENTRANCE PUPIL POSITION | 19.22 | 115.40 | 290.04 |
| EXIT PUPIL POSITION | 146.13 | −86.72 | 96.73 |
| FRONT PRINCIPAL POINT POSITION | 23.72 | 133.95 | 468.68 |
| BACK PRINCIPAL POINT POSITION | −4.35 | −26.87 | −91.68 |

ZOOM LENS UNIT DATA

| UNIT | STARTING SURFACE | FOCAL LENGTH | LENS OVERALL LENGTH | FRONT PRINCIPAL POINT POSITION | BACK PRINCIPAL POINT POSITION |
|---|---|---|---|---|---|
| 1 | 1 | 40.95 | 11.05 | 2.39 | −4.36 |
| 2 | 6 | −7.21 | 7.99 | 0.62 | −5.77 |
| 3 | 14 | ∞ | 0.00 | 0.00 | −0.00 |
| 4 | 15 | 22.44 | 12.17 | −7.28 | −13.18 |
| 5 | 21 | 18.03 | 3.19 | 0.37 | −1.49 |
| 6 | 24 | ∞ | 4.01 | 1.60 | −1.60 |

SINGLE LENS DATA

| LENS | STARTING SURFACE | FOCAL LENGTH |
|---|---|---|
| 1 | 1 | −79.50 |
| 2 | 2 | 46.97 |
| 3 | 4 | 61.40 |
| 4 | 6 | −8.59 |
| 5 | 8 | −30.91 |
| 6 | 10 | −21.73 |
| 7 | 12 | 17.46 |
| 8 | 15 | 14.56 |
| 9 | 17 | −10.11 |
| 10 | 19 | 19.76 |
| 11 | 21 | 18.07 |
| 12 | 22 | 1929.34 |

TABLE 1

TABLE 1 NUMERICAL EXAMPLE

| | CONDITION | 1 | 2 | 3 | 4 | 5 | 6 |
|---|---|---|---|---|---|---|---|
| (1) | $f3st$ $/f3/z$ | 0.0196 | 0.0161 | 0.0155 | 0.0200 | 0.0410 | 0.0139 |
| (2) | $\beta 2w$ | −0.310 | −0.296 | −0.272 | −0.248 | −0.241 | −0.260 |
| (3) | $f1/f3$ | 1.749 | 1.835 | 1.771 | 2.275 | 2.503 | 1.825 |
| (4) | $f2st/f2$ | 2.759 | 2.988 | 3.432 | 3.267 | 3.144 | 3.618 |
| (5) | $nd2$ | 1.854 | 1.854 | 1.854 | 1.854 | 1.854 | 1.861 |

Referring now to FIG. 13, a description will be given of a video camera that utilizes a zoom lens of this invention for an image pickup optical system. In FIG. 13, reference numeral 10 denotes a video camera body, and reference numeral 11 denotes an image pickup optical system that includes the zoom lens of this invention. Reference numeral 12 denotes an image pickup device (photoelectric conversion element), such as a CCD sensor and a CMOS sensor, configured to receive light of an object image formed by the image pickup optical system 11. Reference numeral 13 denotes a memory configured to store information corresponding to the object image photoelectrically converted by the image pickup device 12. Reference numeral 14 denotes a viewfinder used to observe the object image displayed in a display device (not illustrated). By applying the zoom lens of this invention to the image pickup apparatus, such as the video camera, the image pickup apparatus can be made smaller and exhibit a higher optical performance. The zoom lens of this invention is also applicable to the digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus is applicable to an image pickup application of an object.

This application claims the benefit of Japanese Patent Application No. 2010-007578, filed Jan. 16, 2010, which is hereby incorporated by reference herein in its entirety.

What is claimed is:

1. A zoom lens comprising, in order from an object side to an image side, a first lens unit of a positive refractive power, a second lens unit of a negative refractive power, a third lens unit of a positive refractive power, and a fourth lens unit of a positive refractive power,
   wherein in zooming, the first lens unit is configured fixed and the second, third, and fourth lens units are configured movable, and
   wherein the following conditions are satisfied where f3st is a movement amount of the third lens unit associated with zooming from a wide angle end to a telephoto end, f3 is a focal length of the third lens unit, $\beta 2w$ is a lateral magnification of the second lens unit at the wide angle end, and z is a zoom ratio, $0.010 < (|f3st|/f3)/z < 0.045$, and $-0.33 < \beta 2w < -0.20$.

2. The zoom lens according to claim 1, wherein the following condition is satisfied where f1 is a focal length of the first lens unit: $1.6 < f1/f3 < 2.7$.

3. The zoom lens according to claim 1, wherein the following condition is satisfied where f2st is a movement amount of the second lens unit associated with the zooming from the wide angle end to the telephoto end, and f2 is a focal length of the second lens unit: $2.4 < |f2st/f2| < 3.8$.

4. The zoom lens according to claim 1, wherein the following condition is satisfied where nd2 is an average refractive index of a material of each lens included in the second lens unit: $nd2 > 1.80$.

5. The zoom lens according to claim 1, further comprising an aperture stop provided between the second lens unit and the third lens unit, wherein the third lens unit is configured to move independent of the aperture stop in the zooming.

6. The zoom lens according to claim 1, wherein at least part of the third lens unit is moved such that a movement direction thereof includes a component orthogonal to the optical axis to shift an image in a direction orthogonal to the optical axis.

7. An image pickup apparatus comprising:
   a zoom lens comprising, in order from an object side to an image side, a first lens unit of a positive refractive power, a second lens unit of a negative refractive power, a third lens unit of a positive refractive power, and a fourth lens unit of a positive refractive power,
   wherein in zooming, the first lens unit is configured fixed and the second, third, and fourth lens units are configured movable, and
   wherein the following conditions are satisfied where f3st is a movement amount of the third lens unit associated with zooming from a wide angle end to a telephoto end, f3 is a focal length of the third lens unit, $\beta 2w$ is a lateral magnification of the second lens unit at the wide angle end, and z is a zoom ratio, $0.010 < (|f3st|/f3)/z < 0.045$, and $-0.33 < \beta 2w < -0.20$; and an image pickup device configured to receive an image formed by the zoom lens.

8. The image pickup apparatus according to claim 7, further comprising a unit that corrects an aberration by an image processing, wherein the zoom lens is configured so that an image circle size on the wide angle side is smaller than that on the telephoto end.

* * * * *